(12) United States Patent
Hirosawa

(10) Patent No.: US 10,866,441 B2
(45) Date of Patent: Dec. 15, 2020

(54) LIQUID CRYSTAL DISPLAY DEVICE

(71) Applicant: Japan Display Inc., Minato-ku (JP)

(72) Inventor: Jin Hirosawa, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/554,944

(22) Filed: Aug. 29, 2019

(65) Prior Publication Data

US 2020/0073157 A1    Mar. 5, 2020

(30) Foreign Application Priority Data

Aug. 30, 2018  (JP) ................. 2018-161585

(51) Int. Cl.
  *G02F 1/13*    (2006.01)
  *G09G 3/36*    (2006.01)
  *G02F 1/1343*  (2006.01)
  *G02F 1/1368*  (2006.01)
  *G02F 1/1362*  (2006.01)

(52) U.S. Cl.
  CPC .......... *G02F 1/1323* (2013.01); *G02F 1/1368* (2013.01); *G02F 1/134309* (2013.01); *G02F 1/136286* (2013.01); *G09G 3/3607* (2013.01); *G02F 2001/134318* (2013.01); *G02F 2001/134345* (2013.01); *G02F 2201/121* (2013.01); *G02F 2201/123* (2013.01); *G09G 2300/0426* (2013.01); *G09G 2310/0202* (2013.01); *G09G 2320/068* (2013.01)

(58) Field of Classification Search
  CPC .................. G02F 1/1323; G09G 2320/068
  See application file for complete search history.

(56) References Cited

U.S. PATENT DOCUMENTS

| 2010/0220043 A1* | 9/2010 | Broughton | G02F 1/1323 345/87 |
| 2013/0265514 A1* | 10/2013 | Li | G02F 1/1343 349/41 |
| 2018/0129090 A1* | 5/2018 | Tsai | G06F 3/0416 |
| 2019/0250442 A1* | 8/2019 | Li | G02F 1/133512 |

FOREIGN PATENT DOCUMENTS

JP    2007-163590 A    6/2007

* cited by examiner

*Primary Examiner* — Alexander P Gross
(74) *Attorney, Agent, or Firm* — Oblon, McClelland, Maier & Neustadt, L.L.P.

(57) ABSTRACT

According to one embodiment, a liquid crystal display device comprises a first substrate including a sub-pixel, a second substrate opposed to the first substrate, and a liquid crystal layer between the first substrate and the second substrate. The first substrate comprises a pixel electrode which is disposed in the sub-pixel and to which a first voltage is supplied, a common electrode including a first electrode and a second electrode arranged in a first direction in the sub-pixel, a first switching element connected to the pixel electrode, and a second switching element connected to the second electrode.

16 Claims, 16 Drawing Sheets

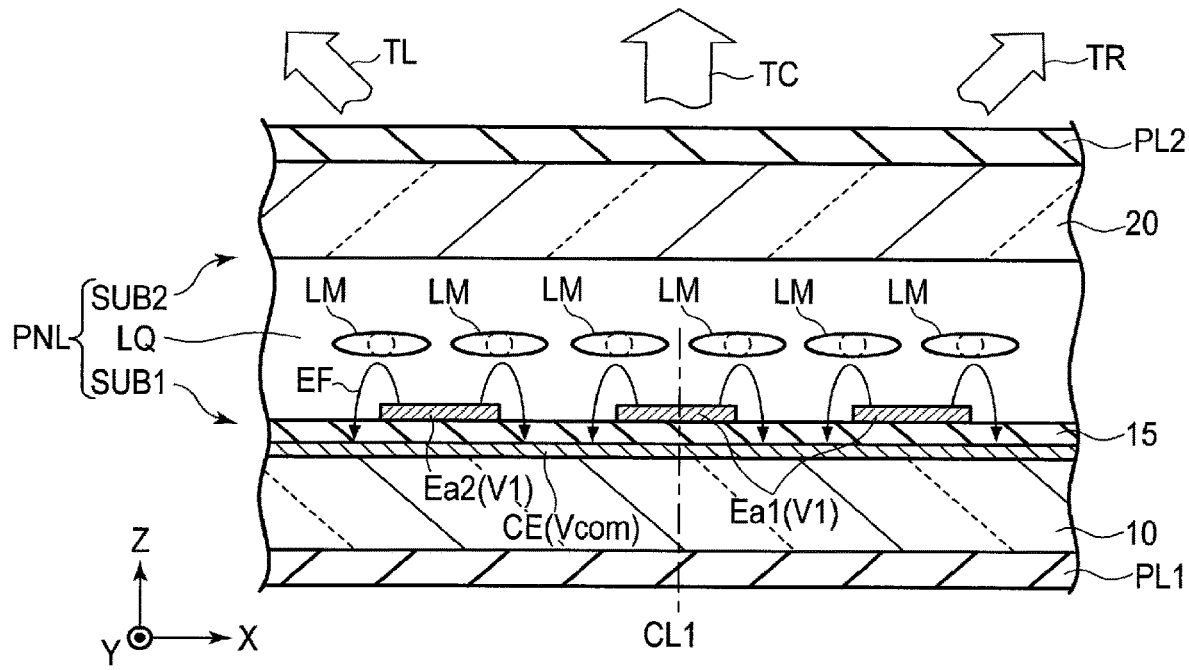
F I G. 6
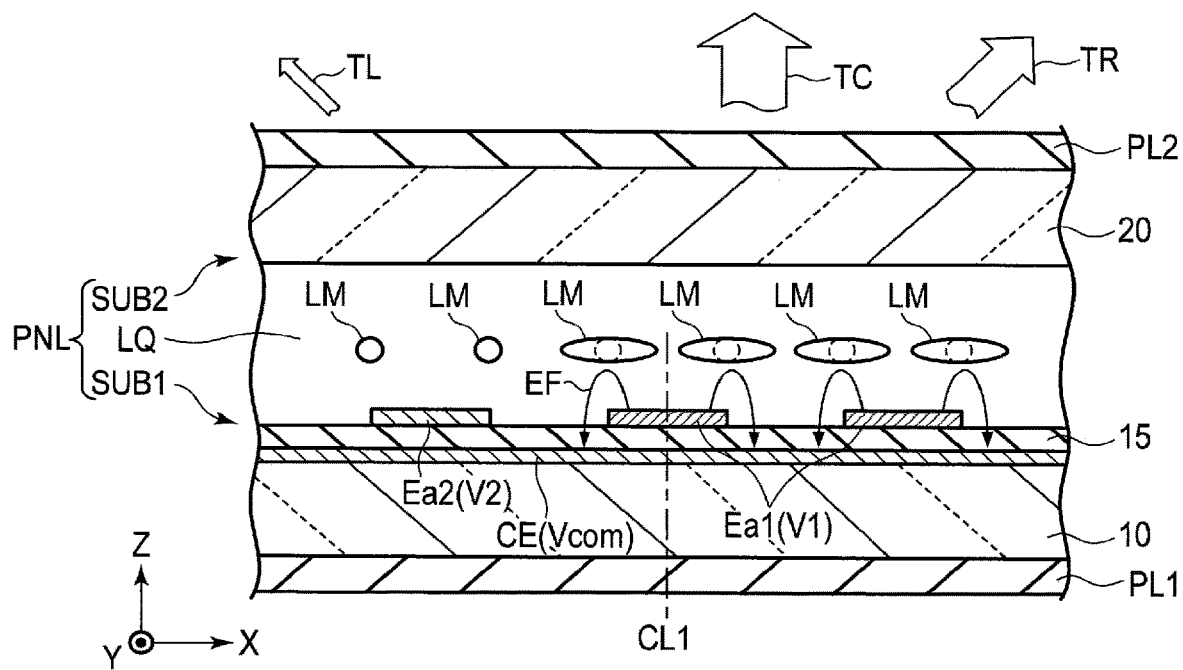
F I G. 7

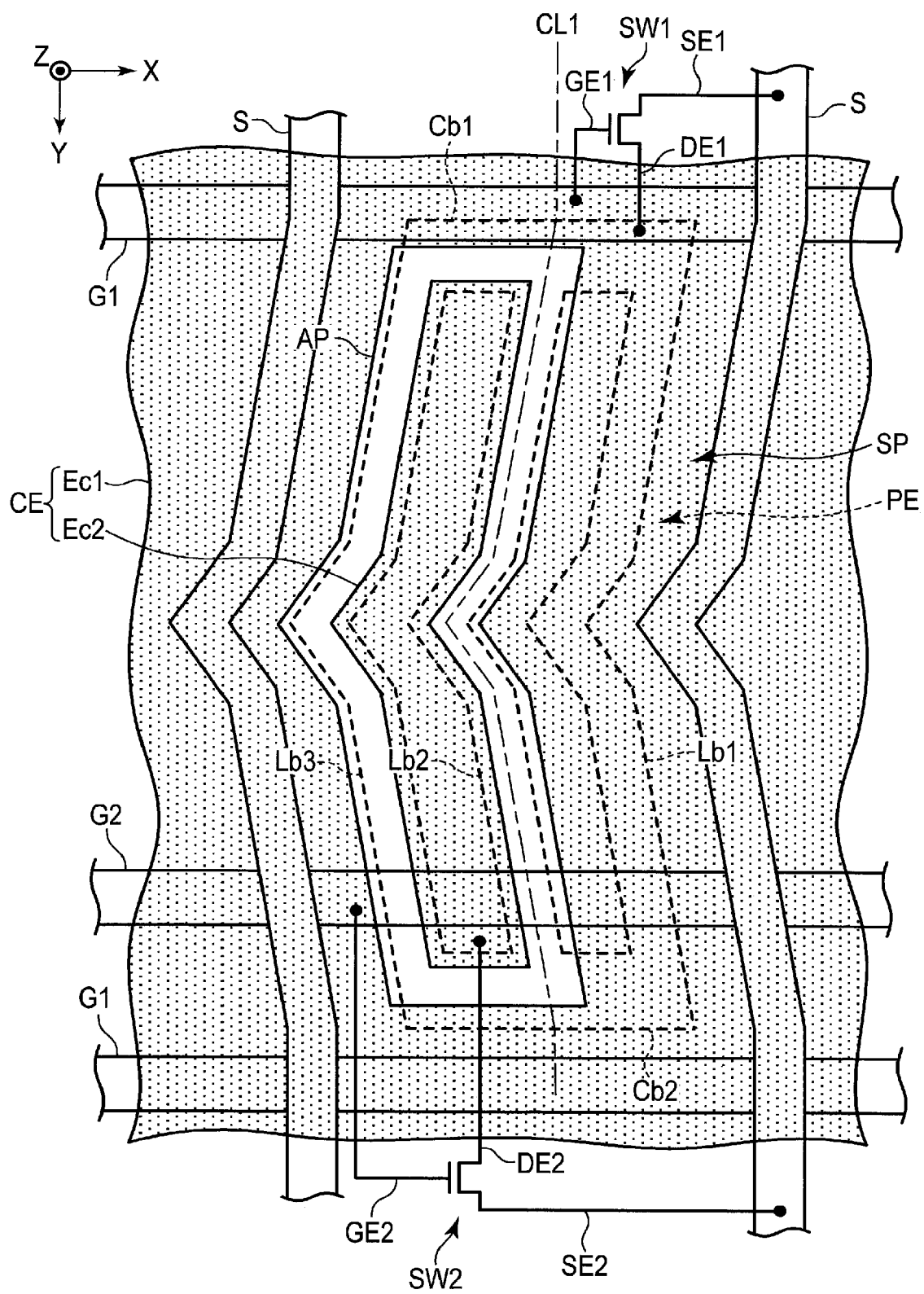
F I G. 10

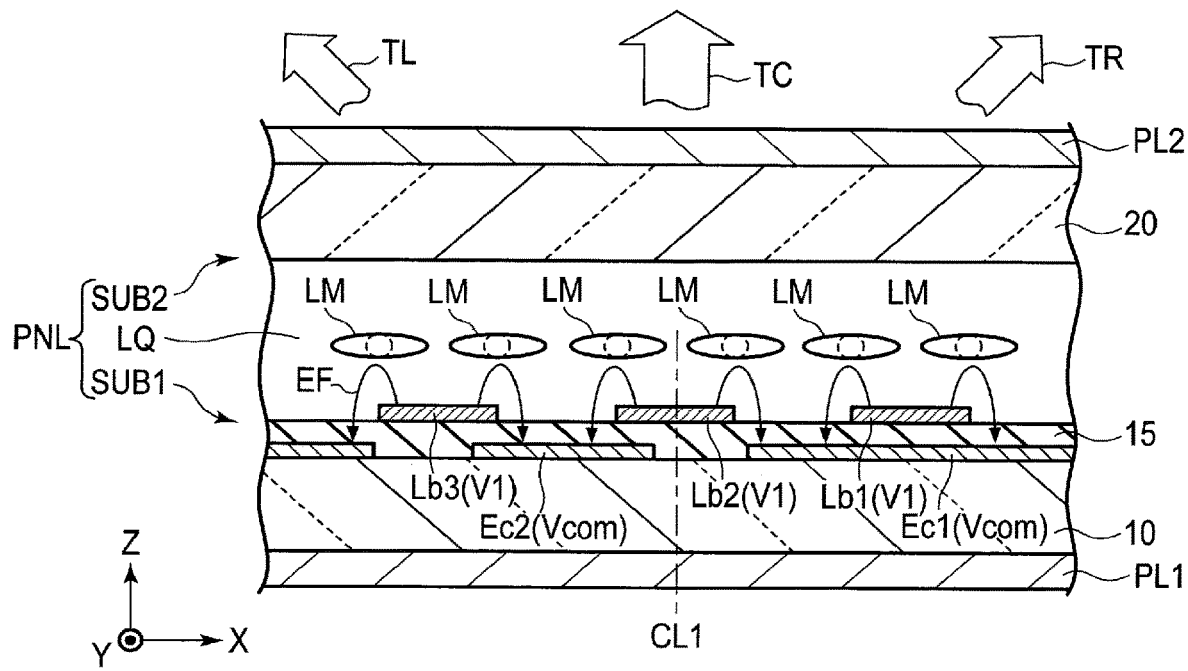
F I G. 11
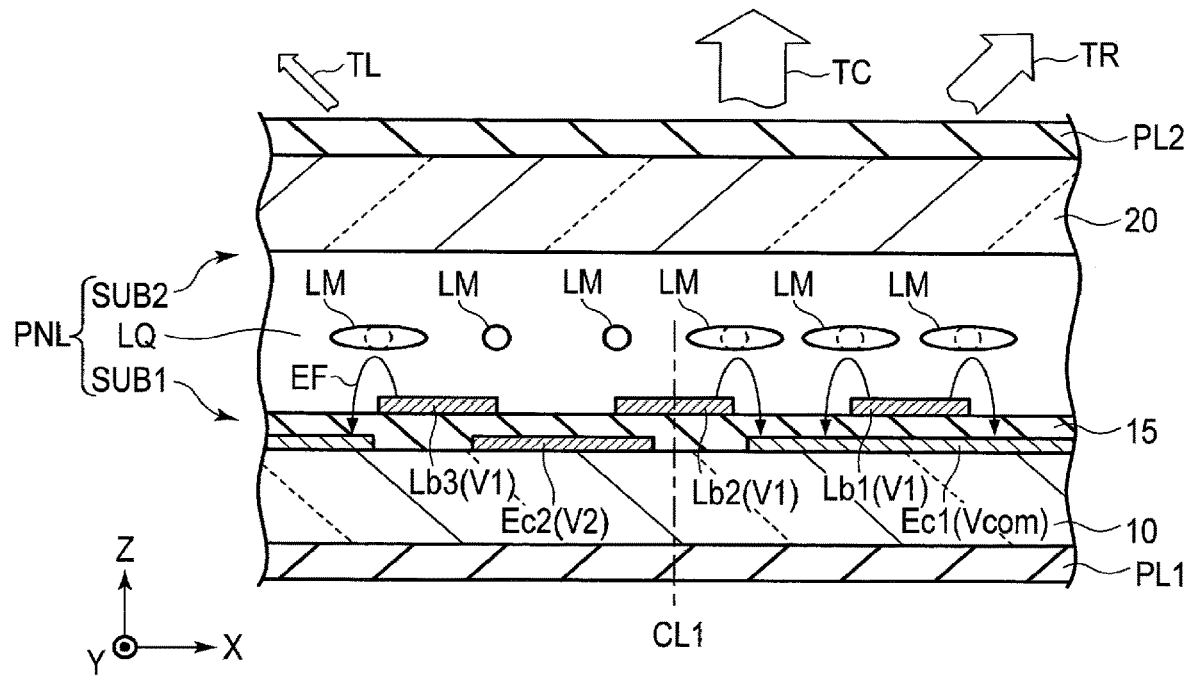
F I G. 12

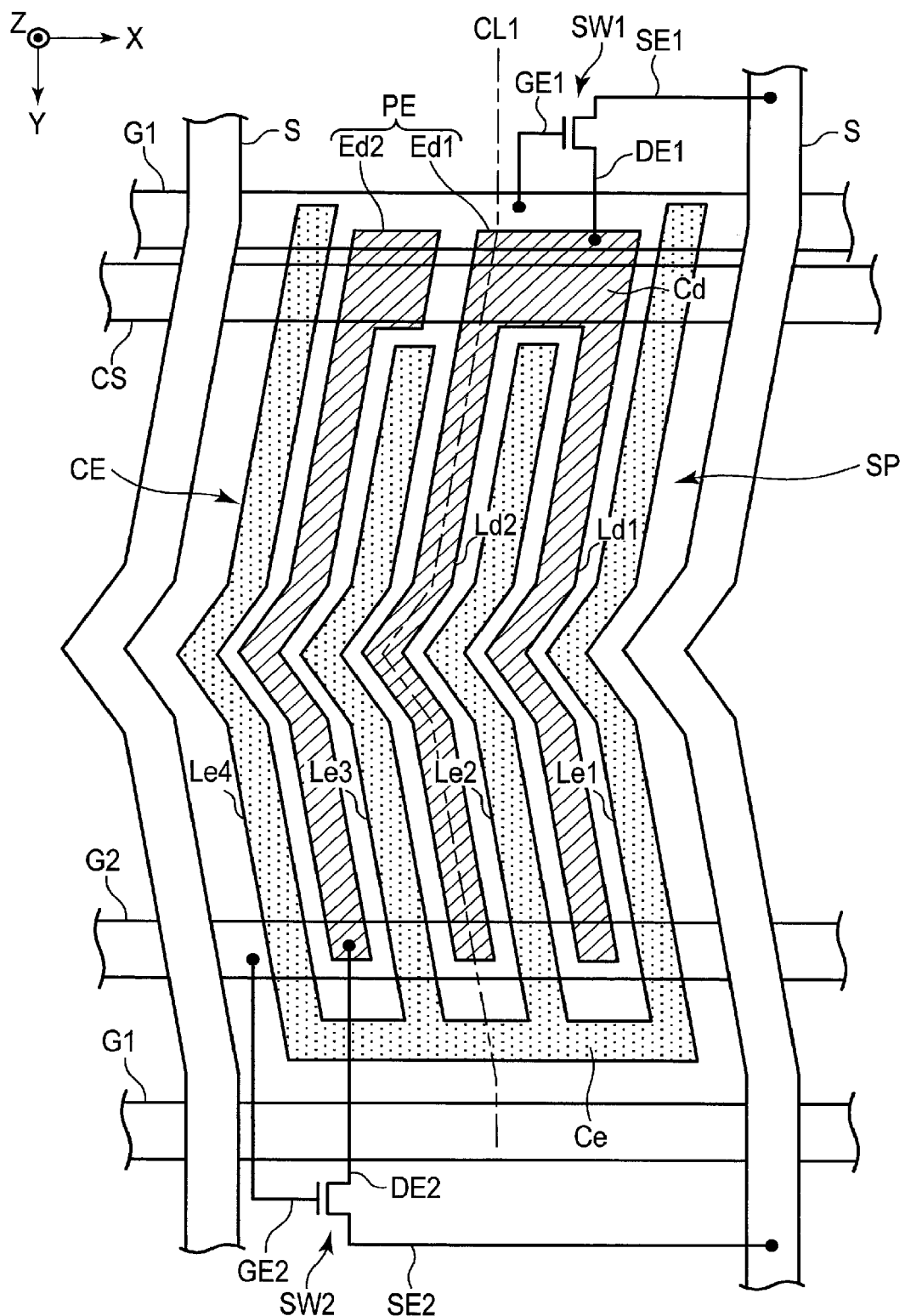
F I G. 13

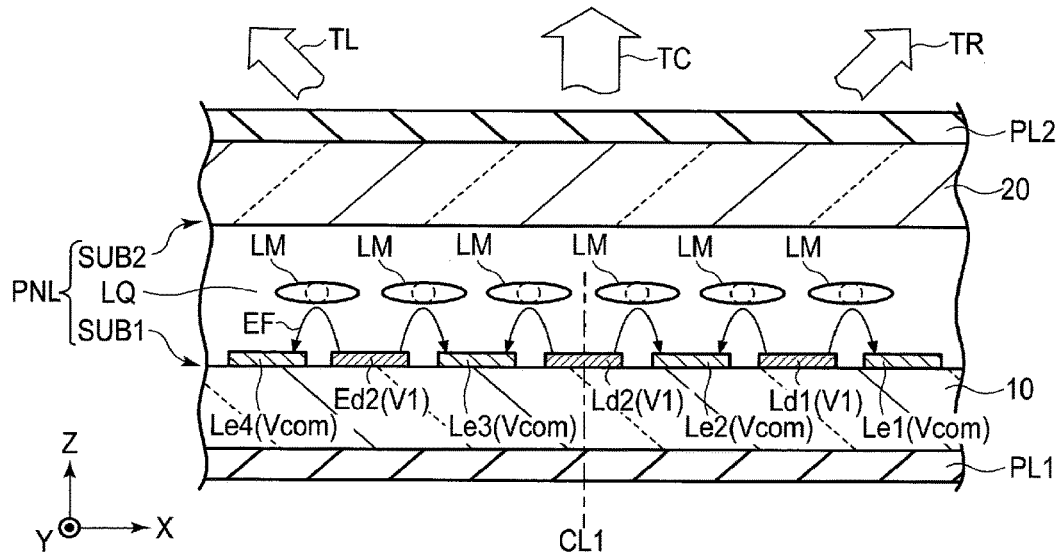
F I G. 14
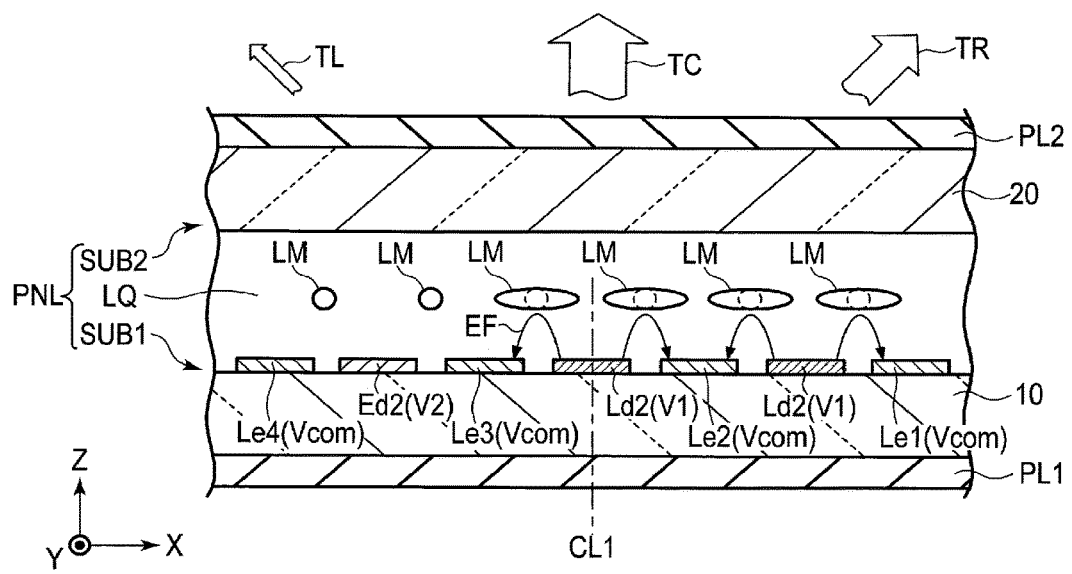
F I G. 15

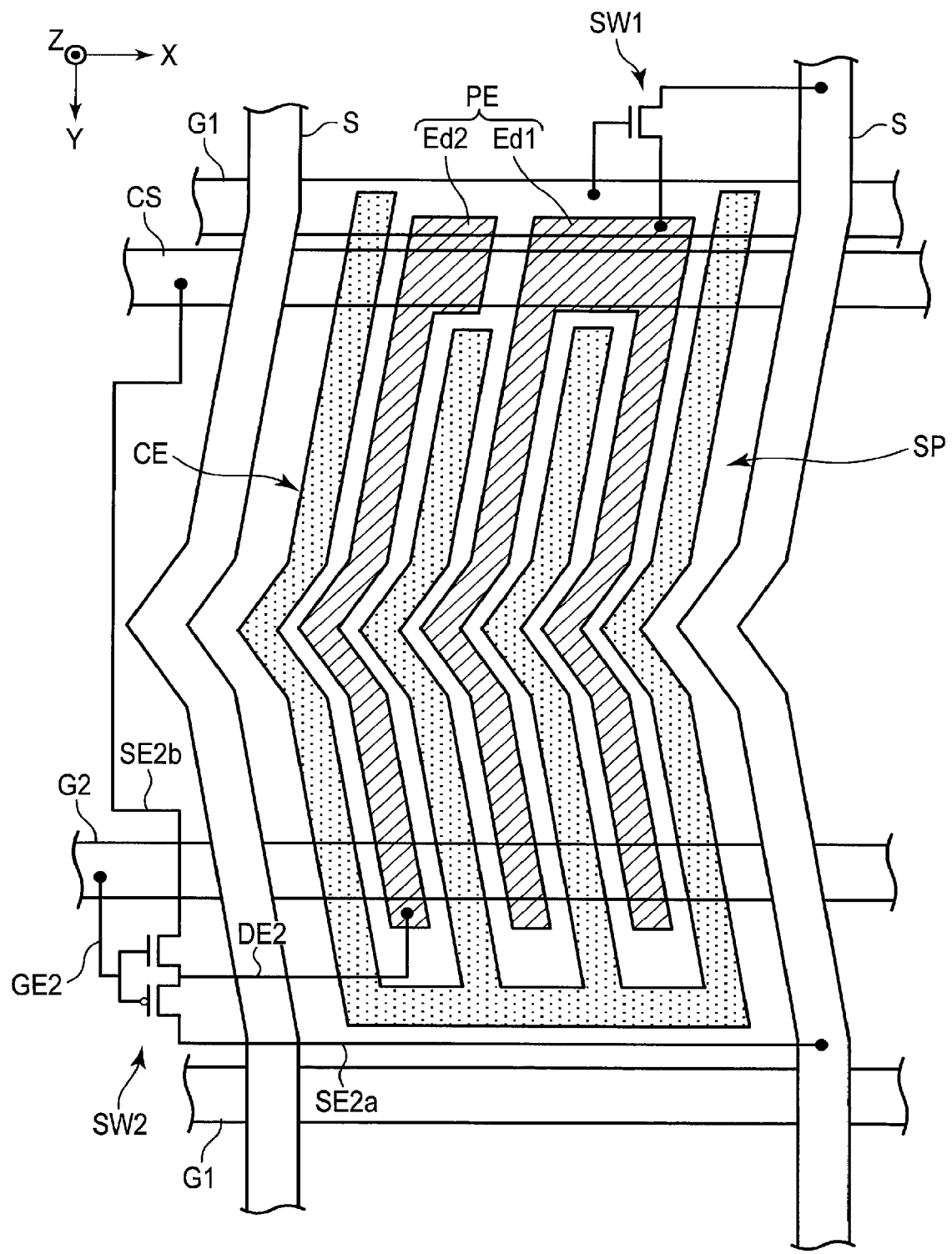
F I G. 16

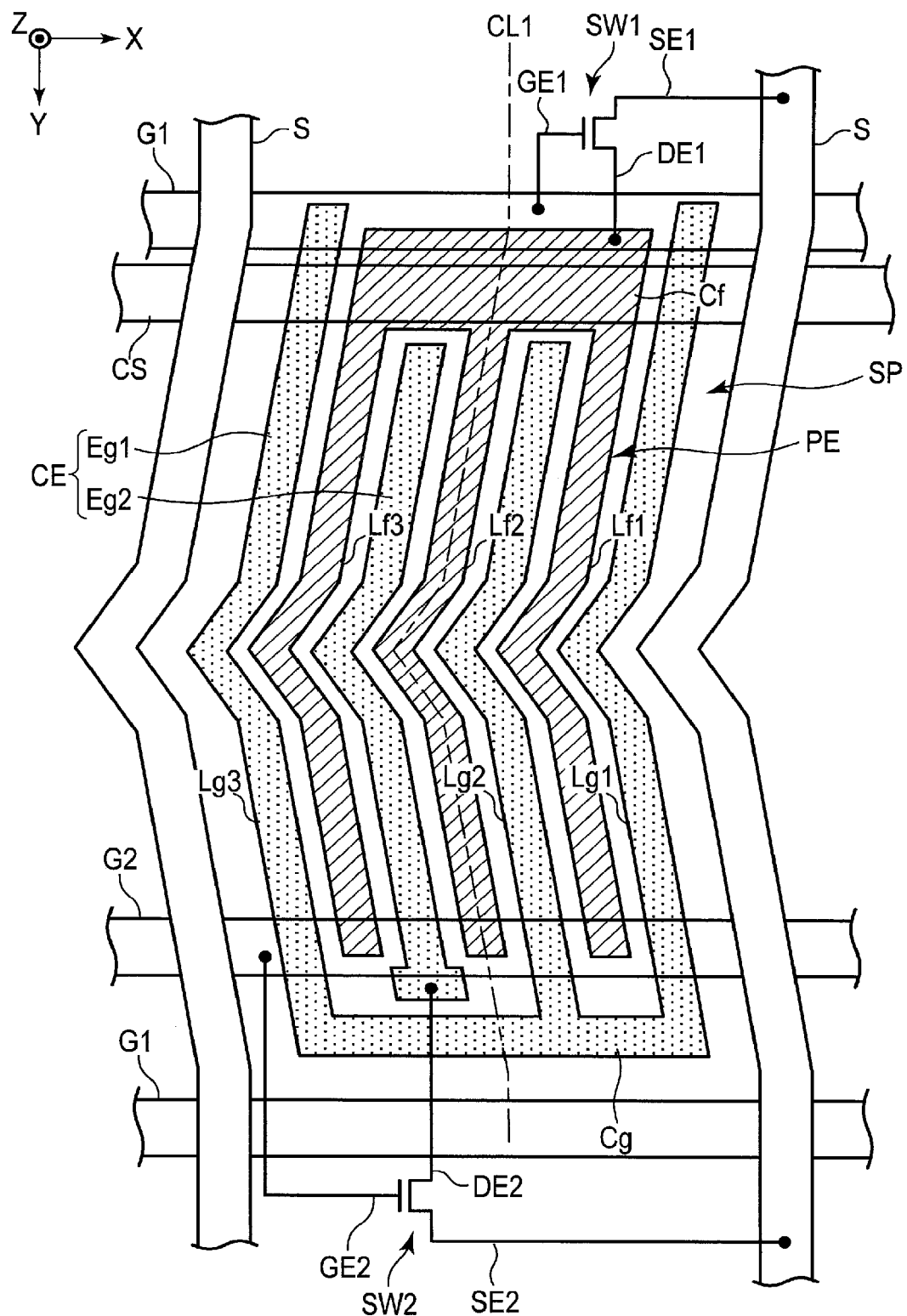
F I G. 17

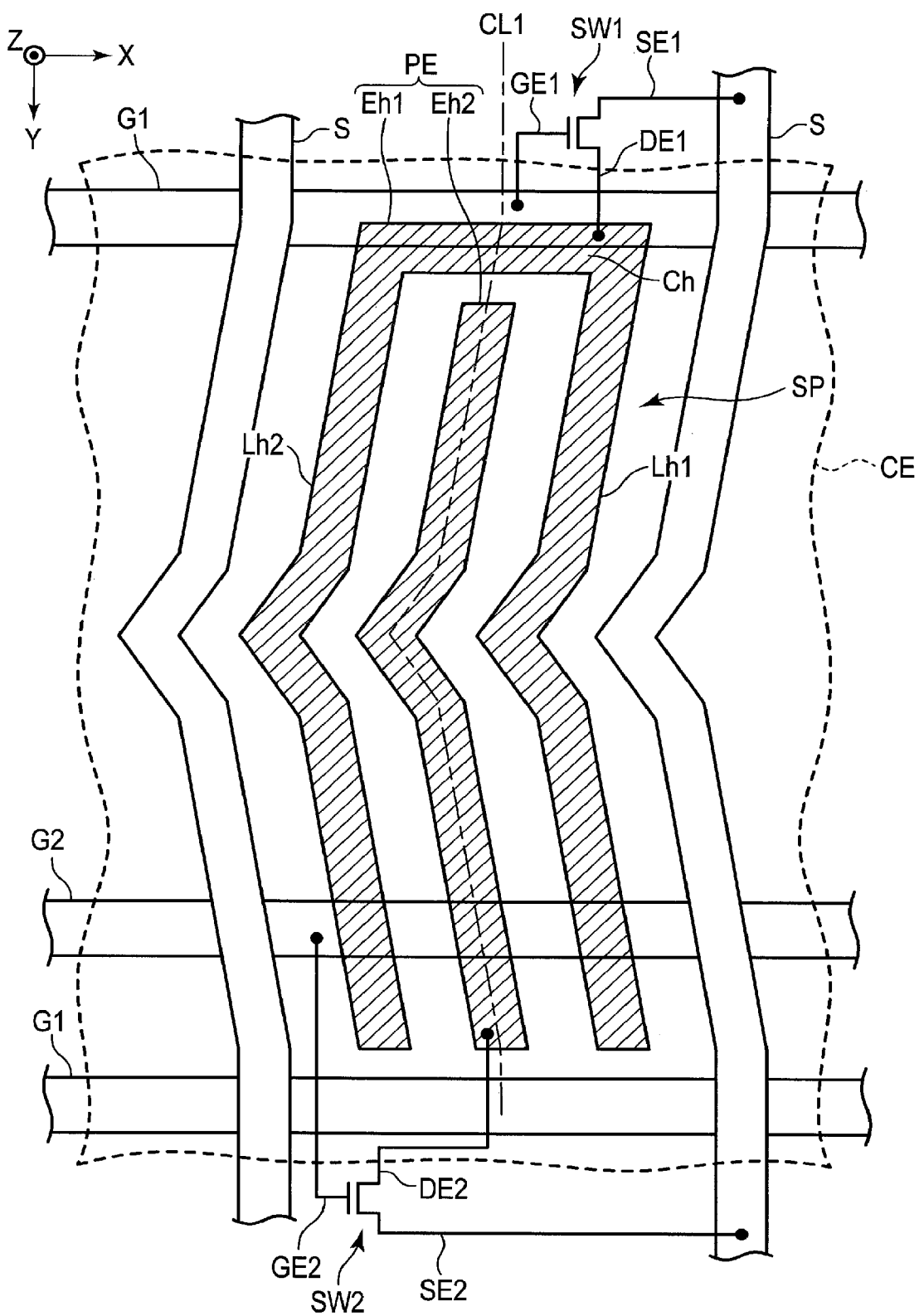
F I G. 21

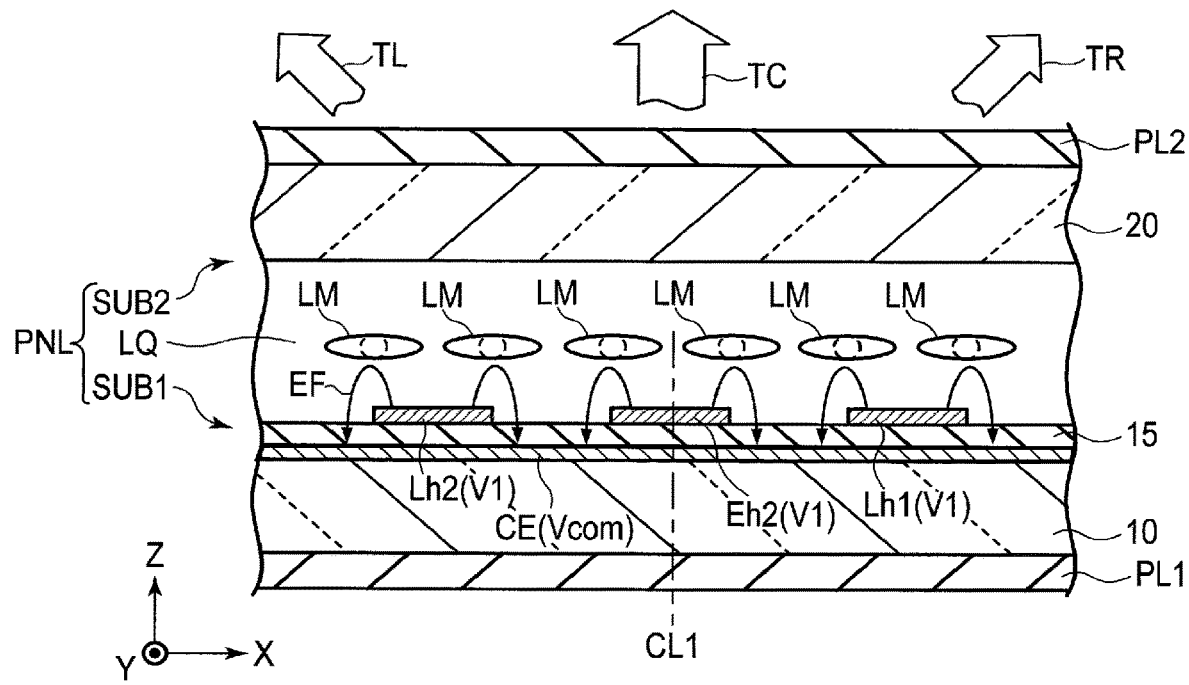
F I G. 22
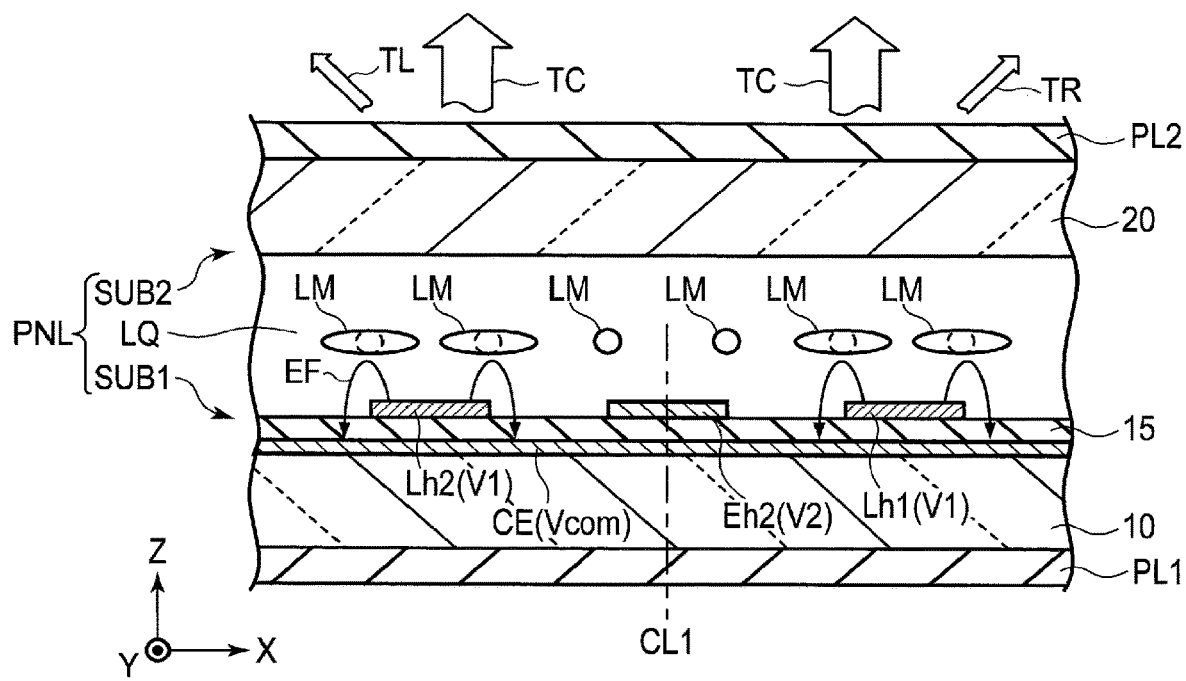
F I G. 23

LIQUID CRYSTAL DISPLAY DEVICE

CROSS-REFERENCE TO RELATED APPLICATIONS

This application is based upon and claims the benefit of priority from Japanese Patent Application No. 2018-161585, filed Aug. 30, 2018, the entire contents of which are incorporated herein by reference.

FIELD

Embodiments described herein relate generally to a liquid crystal display device.

BACKGROUND

Liquid crystal display devices in which a liquid crystal layer is sealed between a pair of substrates have been used in various types of electronic device. In recent years, liquid crystal display devices having wide viewing angles have been realized because of various improvements. Thus, desirable images can be visually recognized also by a person who views a display surface from a direction inclined with respect to the normal direction of the display surface.

On the other hand, in order to limit persons who can visually recognize a screen, it is also requested that the visibility of an image from a specific direction be intentionally lowered.

BRIEF DESCRIPTION OF THE DRAWINGS

FIG. 6 is a schematic sectional view of the display panel in a first mode in the first embodiment.

FIG. 7 is a schematic sectional view of the display panel in a second mode in the first embodiment.

FIG. 10 is a schematic plan view showing a structure which can be applied to sub-pixels in a second embodiment.

FIG. 11 is a schematic sectional view of a display panel in a first mode in the second embodiment.

FIG. 12 is a schematic sectional view of the display panel in a second mode in the second embodiment.

FIG. 13 is a schematic plan view showing a structure which can be applied to sub-pixels in a third embodiment.

FIG. 14 is a schematic sectional view of a display panel in a first mode in the third embodiment.

FIG. 15 is a schematic sectional view of the display panel in a second mode in the third embodiment.

FIG. 16 is a schematic plan view showing a structure which can be applied to sub-pixels in a fourth embodiment.

FIG. 17 is a schematic plan view showing a structure which can be applied to sub-pixels in a fifth embodiment.

FIG. 21 is a schematic plan view showing a structure which can be applied to sub-pixels in a seventh embodiment.

FIG. 22 is a schematic sectional view of a display panel in a first mode in the seventh embodiment.

FIG. 23 is a schematic sectional view of the display panel in a second mode in the seventh embodiment.

DETAILED DESCRIPTION

In general, according to one embodiment, a liquid crystal display device comprises a first substrate including a sub-pixel, a second substrate opposed to the first substrate, and a liquid crystal layer between the first substrate and the second substrate. Moreover, the first substrate comprises a pixel electrode which is disposed in the sub-pixel and to which a first voltage is supplied, a common electrode including a first electrode and a second electrode arranged in a first direction in the sub-pixel, a first switching element connected to the pixel electrode, and a second switching element connected to the second electrode.

According to the above-described structure, a liquid crystal display device whose viewing angle can be controlled can be provided.

Several embodiments will be described with reference to the drawings.

The disclosure is merely an example, and proper changes within the spirit of the invention, which are easily conceivable by a person having ordinary skill in the art, are included in the scope of the present invention as a matter of course. In addition, in order to make the description clearer, the drawings may be more schematic than in the actual modes, but they are mere examples and do not limit the interpretation of the present invention. In each of the drawings, the reference symbols of the same or similar elements that are successively arranged may be omitted. Further, in the specification and each of the drawings, structural elements performing the same functions as or similar functions to those already described will be given the same reference symbols, and a redundant detailed description may be omitted.

In each of the embodiments, a transmissive liquid crystal display device comprising a backlight is disclosed as an example of a display device. It should be noted that each of the embodiments does not prevent the individual technical ideas disclosed in each of the embodiments from being applied to other types of display device. The other types of display device are assumed to be, for example, a reflective liquid crystal display device which displays an image using external light and a liquid crystal display device having both transmissive and reflective functions.

First Embodiment

Figure 1:
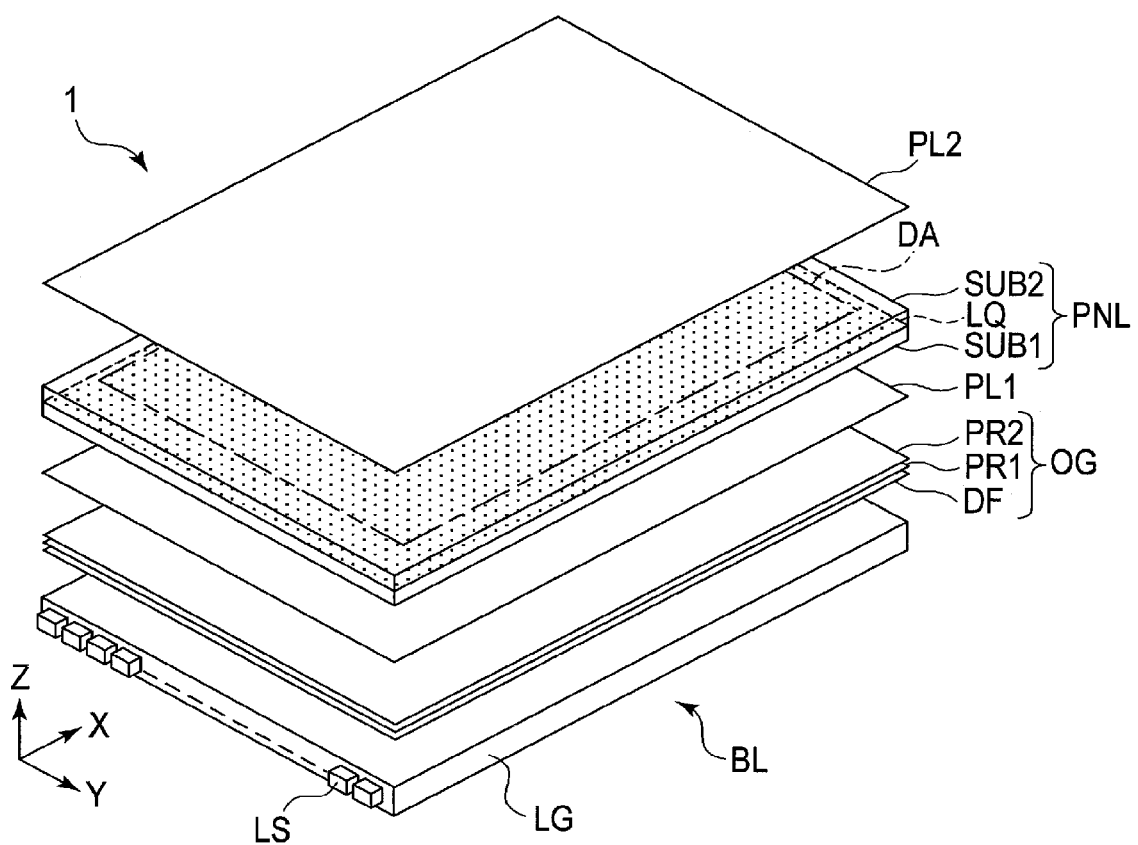
FIG. 1 is an exploded perspective view schematically showing a display device according to a first embodiment.

FIG. 1 is an exploded perspective view schematically showing a structure example of a liquid crystal display device 1 (hereinafter, referred to as the display device 1) according to a first embodiment. As shown in the figure, a first direction X, a second direction Y and a third direction Z are defined. The directions X, Y, and Z are orthogonal to each other in the present embodiment, but may intersect at an angle other than a right angle.

The display device 1 comprises a backlight BL and a display panel PNL. In the example of FIG. 1, the backlight BL is a side-edge type backlight comprising a lightguide LG opposed to the display panel PNL and light-emitting elements LS opposed to a side surface of the lightguide LG. However, the structure of the backlight BL is not limited to the example of FIG. 1, and may be any structure as long as light necessary for image display is supplied. For example, the backlight BL may be a direct type backlight including light-emitting elements disposed below the display panel PNL.

In the example of FIG. 1, the display panel PNL and the lightguide LG are both formed into a rectangular shape having long sides along the first direction X and short sides along the second direction Y. The shapes of the display panel PNL and the lightguide LG are not limited to a rectangular shape, and may be other shapes.

The display panel PNL is a transmissive liquid crystal panel, and comprises a first substrate SUB1, a second substrate SUB2 opposed to the first substrate SUB1, and a liquid crystal layer LQ sealed between the substrates SUB1 and SUB2. The display panel PNL has, for example, a rectangular display area DA.

Moreover, the display device 1 comprises an optical sheet group OG, a first polarizer PL1, and a second polarizer PL2. The optical sheet group OG is disposed between the lightguide LG and the display panel PNL. For example, the optical sheet group OG includes a diffusion sheet DF which diffuses light emitted from the lightguide LG, and a first prism sheet PR1 and a second prism sheet PR2 in which a large number of prisms are formed. The first polarizer PL1 is disposed between the optical sheet group OG and the first substrate SUB1. The second polarizer PL2 is disposed above the second substrate SUB2.

The display device 1 can be used in various devices (electronic devices or vehicles such as automobiles), for example, an in-vehicle device, a smartphone, a tablet terminal, a mobile phone, a personal computer, a television, and a game console.

Figure 2:
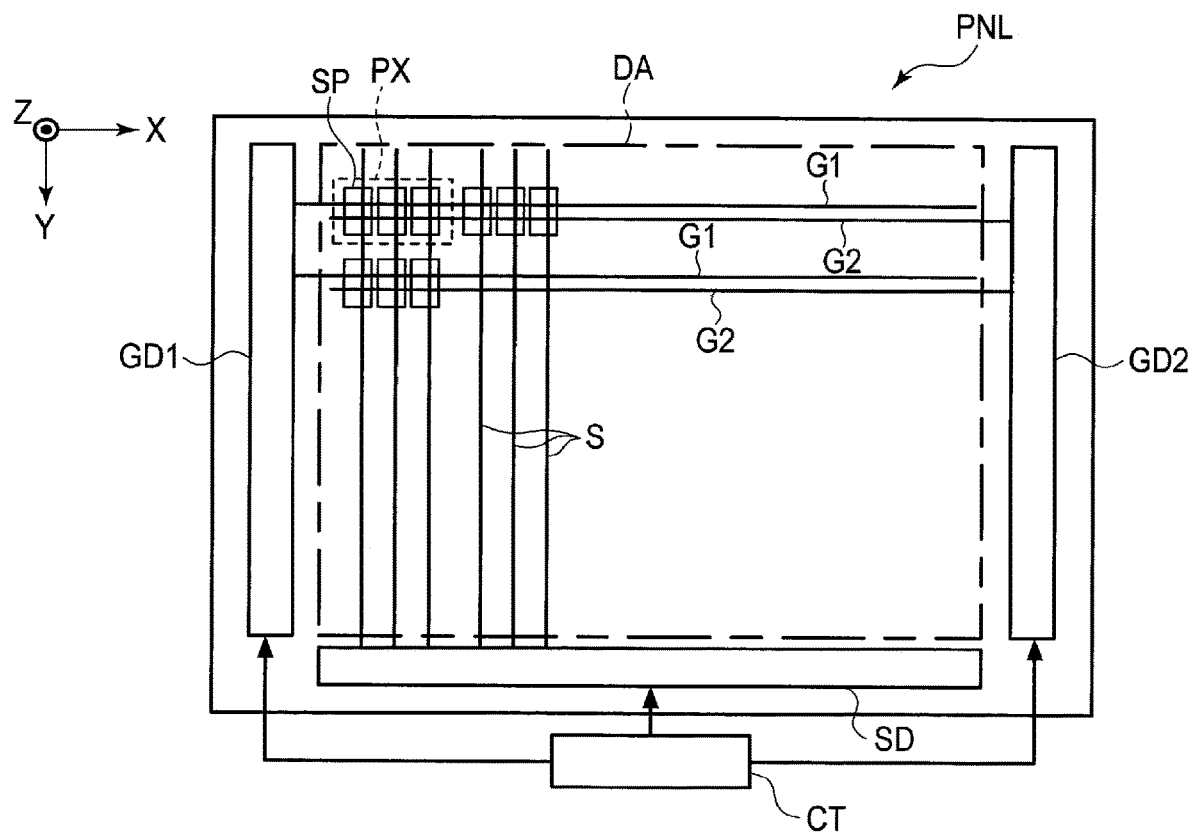
FIG. 2 is a schematic plan view of a display panel in the first embodiment.

FIG. 2 is a schematic plan view showing the display panel PNL. The display panel PNL comprises pixels PX arranged in a matrix in the display area DA. The pixels PX include sub-pixels SP. The pixels PX include sub-pixels SP of red, green, and blue as an example, but may include sub-pixels of other colors such as white.

The display panel PNL comprises first scanning lines G1, second scanning lines G2, video signal lines S, a first scanning driver GD1, a second scanning driver GD2, and a video driver SD.

The first scanning lines G1 and the second scanning lines G2 extend in the first direction X. In the example of FIG. 2, the first scanning lines G1 and the second scanning lines G2 are alternately arranged in the second direction Y. Each of the first scanning lines G1 is connected to the first scanning driver GD1. Each of the second scanning lines G2 is connected to the second scanning driver GD2. The first scanning driver GD1 supplies a first scanning signal to each of the first scanning lines G1. The second scanning driver GD2 supplies a second scanning signal to each of the second scanning lines G2.

The signal lines S extend in the second direction Y, and are arranged in the first direction X. Each of the signal lines S is connected to the video driver SD. The video driver SD supplies a video signal to each of the signal lines S.

The first scanning driver GD1, the second scanning driver GD2, and the video driver SD are controlled by a controller CT. The controller CT may control the above-described light-emitting elements LS. For example, the controller CT can be constituted of an IC and various circuit elements. The controller CT may be constituted of an IC controlling the display panel PNL and an IC controlling the light-emitting elements LS.

Figure 3:
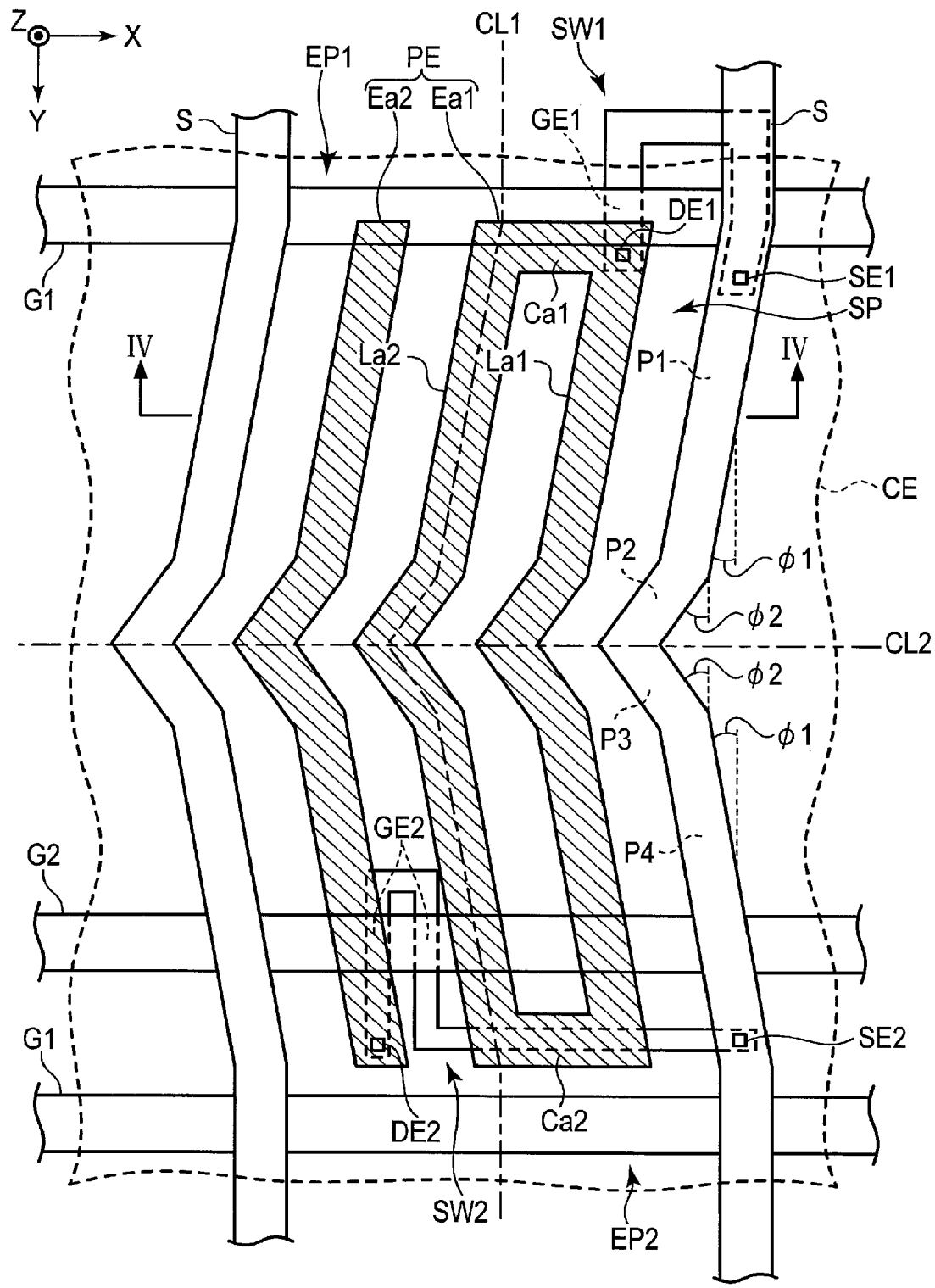
FIG. 3 is a schematic plan view showing a structure which can be applied to sub-pixels in the first embodiment.

FIG. 3 is a schematic plan view showing a structure which can be applied to the sub-pixels SP in the present embodiment. For example, each of the sub-pixels SP corresponds to an area defined by two signal lines S and two first scanning lines G1.

The display panel PNL comprises a pixel electrode PE disposed in each of the sub-pixels SP, and a common electrode CE opposed to the pixel electrode PE. The pixel electrode PE comprises a first electrode Ea1 and a second electrode Ea2. The first electrode Ea1 comprises a first line portion La1, a second line portion La2, a first connection portion Ca1 connecting the upper end portions in the figure of the line portions La1 and La2, and a second connection portion Ca2 connecting the lower end portions in the figure of the line portions La1 and La2. A gap is formed between the second line portion La2 and the second electrode Ea2, which are electrically independent of each other.

The number of line portions of the first electrode Ea1 is not limited to two, and the first electrode Ea1 may comprise more line portions. In addition, in the example of FIG. 3, the second electrode Ea2 is constituted of one line portion. However, the second electrode Ea2 may be constituted of a plurality of line portions.

In the example of FIG. 3, each of the signal lines S includes a first portion P1, a second portion P2, a third portion P3, and a fourth portion P4, and extends in the second direction Y while being bent. The first portion P1 is inclined at an acute angle $\varphi1$ clockwise with respect to the second direction Y. The second portion P2 is inclined at an acute angle $\varphi2$ clockwise with respect to the second direction Y. The third portion P3 is inclined at the acute angle $\varphi2$ counterclockwise with respect to the second direction Y. The fourth portion P4 is inclined at the acute angle $\varphi1$ counterclockwise with respect to the second direction Y. The acute angle $\varphi2$ is greater than the acute angle $\varphi1$.

Each of the line portions La1 and La2 and the second electrode Ea2 are bent in the same shape as that of the portions P1 to P4 of each of the signal lines S. The multi-domain sub-pixels SP thereby can be realized. The sub-pixels SP are not limited to a multi-domain structure, and may have a single-domain structure or may have a pseudo multi-domain structure wherein a multi-domain is realized by a plurality of sub-pixels SP. The same is true of second to seventh embodiments, which will be described later.

The display panel PNL further comprises a first switching element SW1 and a second switching element SW2. The first switching element SW1 comprises a first gate electrode GE1, a first source electrode SE1, and a first drain electrode DE1. The first gate electrode GE1 is connected to the first scanning line G1. The first source electrode SE1 is connected to the signal line S. The first drain electrode DE1 is connected to the first electrode Ea1. The first gate electrode GE1 may be part of the first scanning line G1. The first source electrode SE1 may be part of the signal line S. The first drain electrode DE1 may be part of the first electrode Ea1.

The second switching element SW2 comprises a second gate electrode GE2, a second source electrode SE2, and a second drain electrode DE2. The second gate electrode GE2 is connected to the second scanning line G2. The second source electrode SE2 is connected to the same signal line S, to which the first source electrode SE1 is connected. The second drain electrode DE2 is connected to the second electrode Ea2. The second gate electrode GE2 may be part of the second scanning line G2. The second source electrode SE2 may be part of the signal line S. The second drain electrode DE2 may be part of the second electrode Ea2.

In the above-described structure, different voltages can be supplied to the first electrode Ea1 and the second electrode Ea2. That is, voltages to be applied to the electrodes Ea1 and Ea2, respectively, are supplied to the signal line S in a time-division manner from the video driver SD. Moreover, at the time when the voltage to be applied to the first electrode Ea1 is supplied to the signal line S, a first scanning signal is supplied from the first scanning driver GD1 to the first scanning line G1, and at the time when the voltage to be applied to the second electrode Ea2 is supplied to the signal line S, a second scanning signal is supplied from the second scanning driver GD2 to the second scanning line G2.

In the example of FIG. 3, the first electrode Ea1 is disposed between the signal line S, to which each of the source electrodes SE1 and SE2 is connected, and the second electrode Ea2. As another example, the second electrode Ea2 may be disposed between this signal line S and the first electrode Ea1.

FIG. 3 shows a center CL1 in the first direction X and a center CL2 in the second direction Y of the sub-pixel SP. In the example of FIG. 3, the second line portion La2 overlaps the center CL1. Moreover, the second electrode Ea2 deviates from the center CL1 to the left in the figure. However, the first electrode Ea1 may not overlap the center CL1, and at least part of the second electrode Ea2 may overlap the center CL1. The center CL2 is identical to, for example, the border between the second portion P2 and the third portion P3, but is not limited to this example.

In the following description, the upper end portion in the figure of the sub-pixel SP will be referred to as a first end portion EP1, and the lower end portion in the figure will be referred to as a second end portion EP2. The second scanning line G2 is disposed between the center CL2 and the second end portion EP2. As an example, the distance between the second scanning line G2 and the center CL2 is greater than the distance between the second scanning line G2 and the first scanning line G1 on the second end portion EP2 side.

The first gate electrode GE1, the first source electrode SE1, and the first drain electrode DE1 are located on the first end portion EP1 side with respect to the center CL2. The second gate electrode GE2, the second source electrode SE2, and the second drain electrode DE2 are located on the second end portion EP2 side with respect to the center CL2.

In the example of FIG. 3, the first switching element SW1 and the second switching element SW2 of a double-gate type in which a semiconductor intersects a scanning line twice are shown. However, the switching elements SW1 and SW2 may be single-gate type switching elements. For example, the same shapes as those of the switching elements SW1 and SW2 shown in FIG. 3 or shapes obtained by making modifications to the switching elements SW1 and SW2 shown in FIG. 3 as appropriate can be applied to the shapes of switching elements SW1 and SW2 in FIG. 10, FIG. 13, FIG. 16, FIG. 17, FIG. 20, and FIG. 21, which will be described later.

Figure 4:
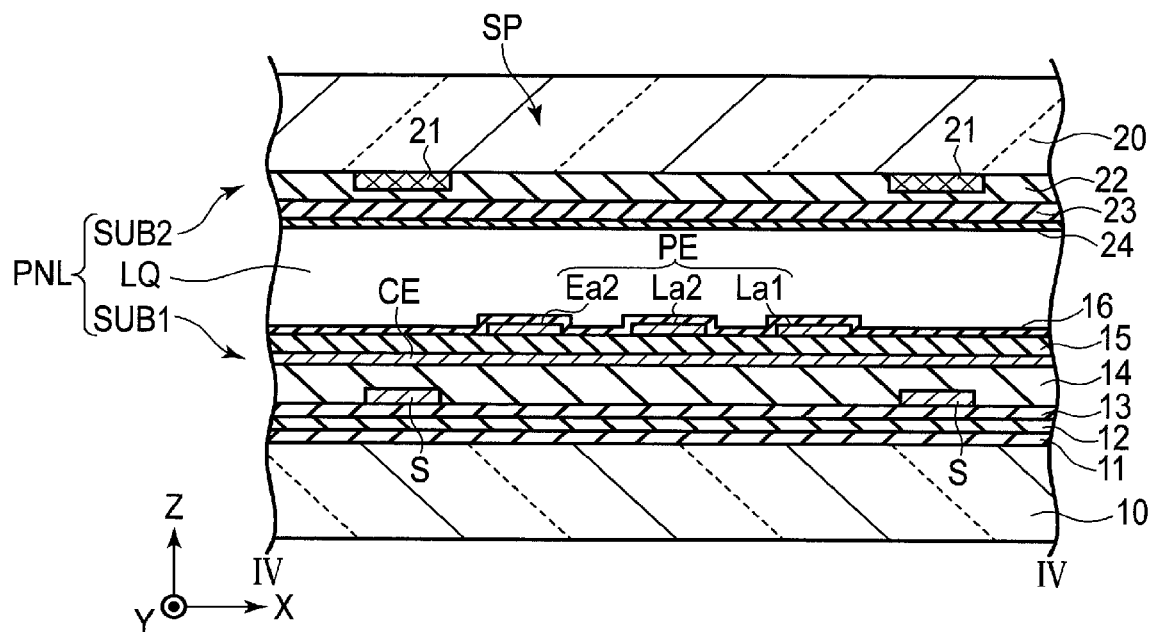
FIG. 4 is a schematic sectional view of the display panel along line IV-IV of FIG. 3.

FIG. 4 is a schematic sectional view of the display panel PNL along line IV-IV of FIG. 3. The first substrate SUB1 comprises a first transparent base material 10, a first insulating layer 11, a second insulating layer 12, a third insulating layer 13, a fourth insulating layer 14, a fifth insulating layer 15, a first alignment film 16, the signal lines S, the common electrode CE, and the pixel electrode PE. Although not shown in FIG. 4, the first substrate SUB1 also comprises the first scanning line G1, the second scanning line G2, the first switching element SW1, and the second switching element SW2.

The first transparent base material 10 is, for example, glass or resin. The first insulating layer 11 covers the upper surface of the first transparent base material 10. The second insulating layer 12 covers the first insulating layer 11. For example, a semiconductor layer of each of the switching elements SW1 and SW2 is disposed between the first insulating layer 11 and the second insulating layer 12. The third insulating layer 13 covers the second insulating layer 12. For example, each of the scanning lines G7 and G2 is disposed between the second insulating layer 12 and the third insulating layer 13.

The signal lines S are disposed on the third insulating layer 13. The fourth insulating layer 14 covers the signal lines S and the third insulating layer 13. The fourth insulating layer 14 is formed of, for example, an organic resin material, and is thicker than the other insulating layers 11 to 13 and 15. The common electrode CE is disposed on the fourth insulating layer 14. The fifth insulating layer 15 covers the common electrode CE. The pixel electrode PE (the first line portion La1, the second line portion La2, and the second electrode Ea2) is disposed on the fifth insulating layer 15. The first alignment film 16 covers the pixel electrode PE and the fifth insulating layer 15.

The second substrate SUB2 comprises a second transparent base material 20, a light-shielding layer 21, a color filter 22, an overcoat layer 23, and a second alignment film 24. The second transparent base material 20 is, for example, glass or resin. The light-shielding layer 21 is disposed on the lower surface of the second transparent base material 20. The light-shielding layer 21 is opposed to the signal lines S, the first scanning line G1, and the second scanning line G2, and has an aperture in the sub-pixel SP. The color filter 22 covers the light-shielding layer 21 and the lower surface of the second transparent base material 20. The color filter 22 is colored in a color corresponding to the sub-pixel SP. The overcoat layer 23 covers the color filter 22. The second alignment film 24 covers the overcoat layer 23.

The light-shielding layer 21 is opposed to the first scanning line G1 and the second scanning line G2, and overlaps these scanning lines G1 and G2. Thus, the center in the second direction Y of the aperture of the light-shielding layer 21 in the sub-pixel SP may be located further away from the second scanning line G2 than the center CL2 in the second direction Y of the sub-pixel SP. In this case, the border between the second portion P2 and the third portion P3 and the center in the second direction Y of the aperture of the light-shielding layer 21 in the sub-pixel SP may be made identical to each other. On the other hand, the light-shielding layer 21 may not be opposed to the second scanning line G2. Also in this case, since the second scanning line G2 does not transmit light, the border between the second portion P2 and the third portion P3 and the center in the second direction Y of the aperture of the light-shielding layer 21 in the sub-pixel SP may be made identical to each other as described above.

In addition, the width in the second direction Y of the second scanning line G2 also can be made smaller than the width in the second direction Y of the first scanning line G1. Moreover, in the present embodiment, the area of the second electrode Ea2 is smaller than the area of the first electrode Ea1. Thus, the channel width (the width of a semiconductor at the intersection of a scanning line and the semiconductor)

of the second switching element SW2 connected to the second electrode Ea2 may be made smaller than the channel width of the first switching element SW1 connected to the first electrode Ea1. As a matter of course, the design can be simplified by making the channel width of the first switching element SW1 and the channel width of the second switching element SW2 equal to each other.

The structure shown in FIG. 4 corresponds to fringe field switching (FFS) mode, which is a kind of in-plane switching (IPS) mode. The IPS mode and the FFS mode have the advantage of being capable of realizing a wide viewing angle. However, the structure of the display panel PNL is not limited to the example of FIG. 4. For example, it is possible that the pixel electrode PE is provided in the first substrate SUB1 and the common electrode CE is provided in the second substrate SUB2. In addition, a metal line which is electrically connected to the common electrode CE and which extends along the signal lines S may be provided above or below the common electrode CE. Moreover, the color filter 22 may be provided in the first substrate SUB1. In addition, the first substrate SUB1 and the second substrate SUB2 can be modified into various forms.

Figure 5:
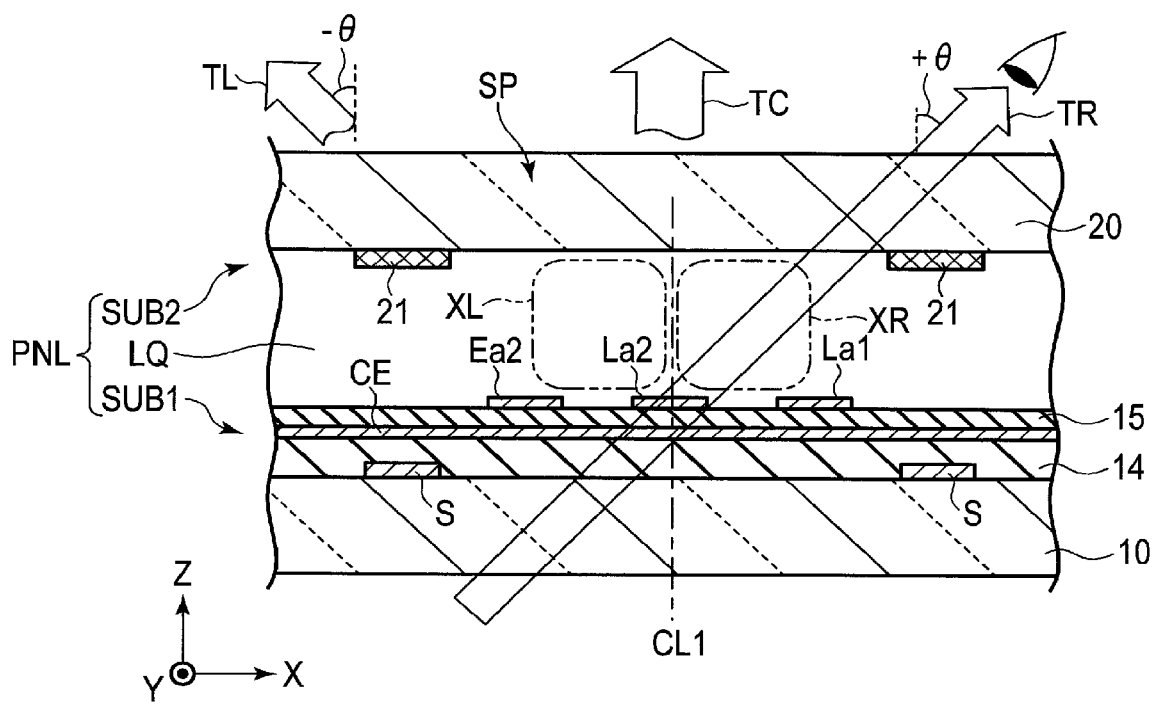
FIG. 5 is a schematic sectional view of the display panel for explaining transmitted light in the first embodiment.

FIG. 5 is a schematic sectional view of the display panel PNL for explaining light transmitted through the display panel PNL. Here, light TC, light TR, and light TL in three directions which are emitted from the backlight BL and are transmitted through the display panel PNL are indicated by arrows. The light TC is light whose polar angle $\theta$ is zero. The light TR is light having a positive polar angle $\theta(+\theta)$. The light TL is light having a negative polar angle $\theta$ ($-\theta$). The polar angles $\theta$ herein refer to inclinations toward the first direction X with respect to the normal direction of the first substrate SUB1 or the second substrate SUB2 in the X-Z plane.

Although the light TC is shown near the center CL1 in FIG. 5, the light TC, which has a polar angle $\theta$ of zero, is transmitted through every part of the sub-pixel SP. In contrast, the light TR and the light TL are restricted by the signal lines S and the light-shielding layer 21. Thus, the light TR is mainly transmitted through a first area XR in the vicinity of the first electrode Ea1 (the line portions La1 and La2) in the liquid crystal layer LQ. Moreover, the light TL is mainly transmitted through a second area XL in the vicinity of the second electrode Ea2 in the liquid crystal layer LQ. Here, the first area XR is an area which is on the right of the center CL1 in the figure and is near the center CL1. The second area XL is an area which is on the left of center CL1 in the figure and is near the center CL1.

FIG. 6 and FIG. 7 are schematic sectional views of the display panel PNL showing the relationship between an electric field EF formed between the pixel electrode PE and the common electrode CE, and liquid crystal molecules LM included in the liquid crystal layer LQ. In FIG. 6, a first voltage V1 is supplied to both of the first electrode Ea1 (the line portions La1 and La2) and the second electrode Ea2. A common voltage Vcom is supplied to the common electrode CE. As an example, the common voltage Vcom is 0 V, and the first voltage V1 varies in the range of −5 V to +5 V according to a gradation. When there is a potential difference between the first electrode Ea1 and the second electrode Ea2, and the common electrode CE, the electric field EF occurs.

The liquid crystal molecules LM are aligned in an initial alignment direction as indicated by broken lines before the occurrence of the electric field EF. When the electric field EF occurs, the liquid crystal molecules LM rotate from the initial alignment direction as indicated by solid lines. In FIG. 6, the liquid crystal molecules LM in the vicinity of the first electrode Ea1 and the liquid crystal molecules LM in the vicinity of the second electrode Ea2 are both rotated because of the electric field EF. In this case, the light TC, the light TR, and the light TL all have sufficient luminance, and image display at a wide viewing angle can be realized.

In FIG. 7, the first voltage V1 is supplied to the first electrode Ea1, and a second voltage V2 is supplied to the second electrode Ea2. The second voltage V2 is, for example, equal to the common voltage Vcom. In this case, the electric field EF is not formed between the second electrode Ea2 and the common electrode CE. Thus, the rotation of the liquid crystal molecules LM in the vicinity of the second electrode Ea2 is suppressed.

The light TC passing through the vicinity of the first electrode Ea1 is influenced by the rotated liquid crystal molecules LM, and thus is transmitted through the second polarizer PL2 without being absorbed therein. The light TR passes through the vicinity of the first electrode Ea1 as described with reference to FIG. 5, and thus is influenced by the rotated liquid crystal molecules LM. Accordingly, the light TR is also transmitted through the second polarizer PL2 without being absorbed therein.

In contrast, most of the light TL passes through the vicinity of the second electrode Ea2 on the left of the center CL1 as described with reference to FIG. 5, and thus, the light TL is unlikely to be influenced by the rotated liquid crystal molecules LM. Accordingly, the light TL, which has been transmitted through the first polarizer PL1 and remains in a polarized state, reaches the second polarizer PL2, and most of the light TL is absorbed in the second polarizer PL2. The luminance of the light TL thereby becomes lower than those of the light TC and the light TR.

The second voltage V2 may be a voltage between the first voltage V1 and the common voltage Vcom. Also in this case, the rotation of the liquid crystal molecules LM in the vicinity of the second electrode Ea2 is suppressed as compared to that of the liquid crystal molecules LM in the vicinity of the first electrode Ea1, to which the first voltage V1 is supplied. Thus, the luminance of the light TL becomes lower than those of the light TC and the light TR.

In the following description, display control executed to supply the second electrode Ea2 with the same first voltage V1 as that supplied to the first electrode Ea1 in each of the sub-pixels SP of the display area DA will be referred to as a first mode. Moreover, display control executed to supply the second electrode Ea2 with the second voltage V2 different from that supplied to the first electrode Eel in each of the sub-pixels SP of the display area DA will be referred to as a second mode.

Figure 8:
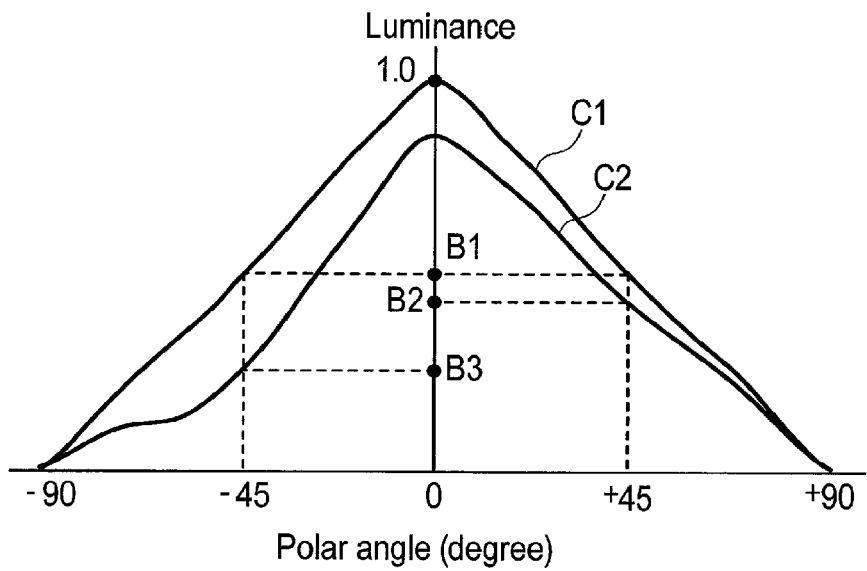
FIG. 8 is a graph showing a result of a simulation of the relationship between a polar angle and luminance.

FIG. 8 is a graph showing a result of a simulation of the relationship between a polar angle and luminance. In the simulation, a 14-inch display device having a pixel pitch of 27 μm was used as a model. A curve C1 shows a simulation result of the first mode, and a curve C2 shows a simulation result of the second mode. The horizontal axis shows a polar angle, and the vertical axis shows a relative value with the luminance at a polar angle of 0° of the curve C1 defined as 1.0.

As is clear from the curve C1, the luminance in the first mode declines more as the absolute value of the polar angle increases more. Moreover, the luminance in a case where the polar angle increases in a positive direction (the right side in the figure) and the luminance in a case where the polar angle increases in a negative direction (the left side in the figure) decline with substantially the same gradient.

As is clear from the curve C2, the luminance declines on the whole in the second mode. In particular, in a range in which the polar angle is negative, the luminance greatly declines and it is hard to visually recognize an image.

In the curve C1, the luminance is B1 when the polar angle is +45° or −45°. In the curve C2, the luminance is B2, which is lower than B1 (B2<B1), when the polar angle is +45°, and the luminance is 53, which is lower than B2 (B3<B2), when the polar angle is −45°. For example, a difference between B2 and B3 (B2−B3) is greater than a difference between B1 and B2 (B1−B2). In this manner, in the second mode, the viewing angle properties differ between the range in which the polar angle is positive and the range in which the polar angle is negative.

The display device 1 can switch between the first mode and the second mode. The first mode and the second mode can be switched, for example, by the controller CT in accordance with an instruction input to the display device 1 from a processor of an electronic device on which the display device 1 is mounted.

In the first mode, the first voltage V1 according to a gradation is supplied to the signal line S in a period during which an image signal is supplied to one sub-pixel SP. Moreover, a first scanning signal is supplied to the first scanning line G1, and a second scanning signal is supplied to the second scanning line G2. Each of the switching elements SW1 and SW2 is thereby turned on, and the first voltage V1 is supplied to each of the first electrode Ea1 and the second electrode Ea2.

In the second mode, the first voltage V1 according to a gradation and the second voltage V2 are supplied to the signal line S in a time-division manner in a period during which an image signal is supplied to one sub-pixel SP. When the first voltage V1 is supplied to the signal line S, a first scanning signal is supplied to the first scanning line G1, and the first switching element SW1 is thereby turned on, so that the first voltage V1 is supplied to the first electrode Ea1. Moreover, when the second voltage V2 is supplied to the signal line S, a second scanning signal is supplied to the second scanning line G2, and the second switching element SW2 is thereby turned on, so that the second voltage V2 is supplied to the second electrode Ea2.

In the first mode, an image in the display area DA can be desirably visually recognized from both a direction at a positive polar angle and a direction at a negative polar angle. Accordingly, the first mode is suitable for using the display device 1 in a situation in which the viewing angle does not need to be limited. In contrast, in the second mode, an image in the display area DA can be desirably visually recognized from a direction at a positive polar angle, but it is hard to visually recognize the image from a direction at a negative polar angle. Accordingly, the second mode is suitable for using the display device 1 in a situation in which the visual recognition of an image from a specific direction should be suppressed.

Figure 9:
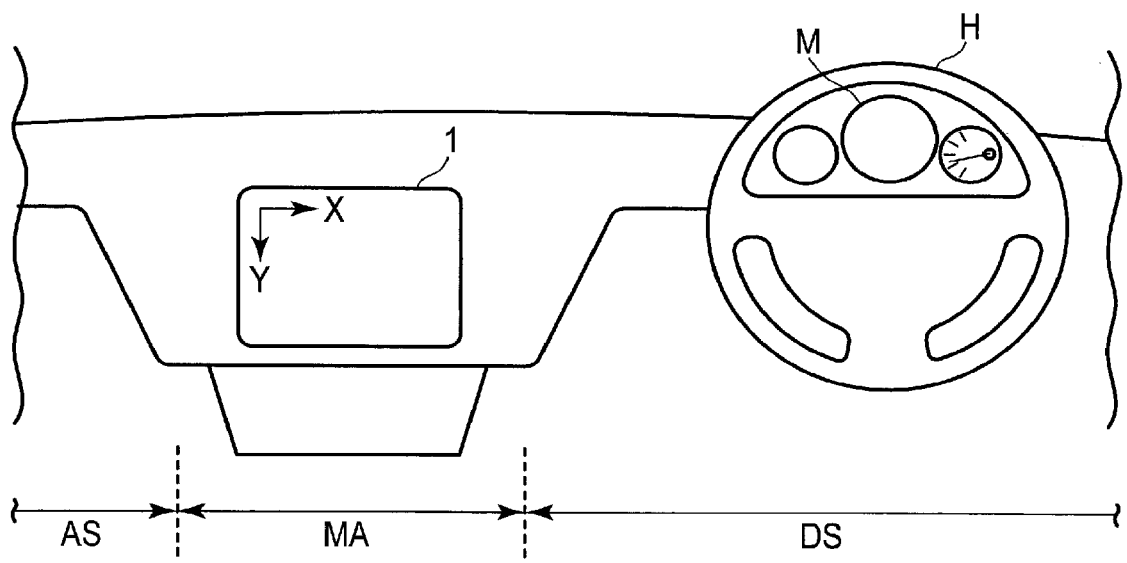
FIG. 9 is a diagram showing an example of the use of the display device.

FIG. 9 is a diagram showing an example of the use of the display device 1. In this example, it is assumed that the display device 1 is mounted on an in-vehicle device. The display device 1 is attached to a middle area MA between a driver's seat DS provided with a wheel H and a meter M, and an assistant driver's seat AD.

For example, if a direction from the assistant driver's seat AS to the driver's seat DS is the first direction X and a direction to the lower side of the figure is the second direction Y as shown in the figure, the visibility of an image from the assistant driver's seat AS can be lowered in the second mode with the pixel structure of the present embodiment. Conversely, the visibility of an image from the driver's seat DS can be lowered by, for example, laterally inverting the structure of the sub-pixels SP shown in FIG. 3 or interchanging the positions of the first electrode Eat and the second electrode Ea2.

The display device 1 can be used in various devices as well as in-vehicle devices. In addition, the direction from which the visibility of an image is lowered is not limited to a leftward direction or a rightward direction, and may be other directions such as an upward direction and a downward direction.

In the present embodiment, the first source electrode SE1 of the first switching element SW1 and the second source electrode SE2 of the second switching element SW2 are both connected to the signal line S. A voltage thereby can be supplied to the first electrode Eat and the second electrode Ea2 via the one signal line S. Thus, the fineness and the aperture ratio of the sub-pixels SP can be easily improved as compared to those in a case where separate signal lines are provided.

Moreover, in the present embodiment, the display panel PNL has an IPS mode (FFS mode) structure, and the sub-pixels SP have a multi-domain structure. Image display at a wide viewing angle and with low dependence on a polar angle thereby can be realized in the first mode.

In addition to the above-described advantages, various favorable advantages can be obtained from the present embodiment.

Second Embodiment

A second embodiment will be described. The description herein mainly focuses on points differing from the first embodiment, and an explanation of the same structure as in the first embodiment is omitted as appropriate.

FIG. 10 is a schematic plan view showing a structure which can be applied to sub-pixels SP in the present embodiment. A common electrode CE is indicated by solid lines, and a pixel electrode PE is indicated by broken lines. The pixel electrode PE comprises a first line portion Lb1, a second line portion Lb2, a third line portion Lb3, a first connection portion Cb1 connecting the upper end portions in the figure of the line portions Lb1 to Lb3, and a second connection portion Cb2 connecting the lower end portions in the figure of the line portions Lb1 to Lb3.

The common electrode CE comprises a first electrode Ec1 and a second electrode Ec2. The first electrode Ec1 comprises an aperture AP provided in each of the sub-pixels SP. The second electrode Ec2 is disposed in the aperture AP. The second electrode Ec2 deviates from a center CL1 in a first direction X of the sub-pixels SP to the left in the figure. A gap is provided between the first electrode Ec1 and the second electrode Ec2, which are electrically independent of each other.

The shapes of the aperture AP, the second electrode Ec2, and the line portions Lb1 to Lb3 are bent in the same way as those of the line portions La1 and La2 of the first embodiment. The multi-domain sub-pixels SP thereby can be realized. The sub-pixels SP are not limited to a multi-domain structure.

In the example of FIG. 10, a second drain electrode DE2 of a second switching element SW2 is connected to the second electrode Ec2. In this structure, different voltages can be supplied to the first electrode Ec1 and the second electrode Ec2. More specifically, a common voltage Vcom is supplied to the first electrode Ec1, and the common voltage Vcom and a second voltage V2 are selectively supplied to the second electrode Ec2. A first voltage V1 according to a gradation is supplied to the pixel electrode PE. The second voltage V2 is, for example, equal to the first voltage V1.

As in the case of the first embodiment, a method of supplying the first voltage V1(=V2) and the common voltage Vcom to a signal line S in a time-division manner can be applied to the control of a first switching element SW1 and the second switching element SW2.

FIG. 11 and FIG. 12 are schematic sectional views of a display panel PNL showing the relationship between an electric field EF formed between the pixel electrode PE and the common electrode CE and liquid crystal molecules LM included in a liquid crystal layer LQ. In FIG. 11, the first voltage V1 is supplied to the pixel electrode PE (the line portions Lb1 to Lb3), and the common voltage Vcom is supplied to the common electrode CE (the electrodes Ec1 and Ec2). The electric field EF thereby occurs in the vicinity of the line portions Lb1 to Lb3, and the liquid crystal molecules LM rotate as indicated by solid lines from an initial alignment direction indicated by broken lines. In this case, light TC, light TR, and light TL all have sufficient luminance, and image display in a first mode at a wide viewing angle can be realized.

In FIG. 12, the second voltage V2 is supplied to the second electrode Ec2. In this case, the electric field EF is not formed between the second line portion Lb2 and the second electrode Ec2 and between the third line portion Lb3 and the second electrode Ec2. Thus, the rotation of the liquid crystal molecules LM in the vicinity of the second electrode Ec2 is suppressed. Since most of the light TL passes through an area on the left of the center CL1 as described with reference to FIG. 5, the light TL is unlikely to be influenced by the rotated liquid crystal molecules LM. Thus, the light TL, which has been transmitted through a first polarizer PL1 and remains in a polarized state, reaches a second polarizer PL2, and most of the light TL is absorbed in the second polarizer PL2. Image display in a second mode in which the luminance of the light TL is lower than those of the light TC and the light TR thereby can be realized.

The second voltage V2 may be a voltage between the first voltage V1 and the common voltage Vcom. Also in this case, the rotation of the liquid crystal molecules LM in the vicinity of the second electrode Ec2 is suppressed as compared to that in a case where the common voltage Vcom is supplied to the second electrode Ec2.

Also from the structure of the present embodiment, the same advantages as those of the first embodiment can be obtained. Furthermore, the luminance of the light TR can be lowered in the second mode by disposing the second electrode Ec2 on the first line portion Lb1 side with respect to the center CL1.

Third Embodiment

A third embodiment will be described. The description herein mainly focuses on points differing from each of the above-described embodiments, and an explanation of the same structure as in each of the above-described embodiments is omitted as appropriate.

FIG. 13 is a schematic plan view showing a structure which can be applied to sub-pixels SP in the present embodiment. In the present embodiment, a pixel electrode PE and a common electrode CE are disposed in the same layer. The pixel electrode PE comprises a first electrode Ed1 and a second electrode Ed2. The first electrode Ed1 comprises a first line portion Ld1, a second line portion Ld2, and a connection portion Cd connecting the upper end portions in the figure of the line portions Ld1 and Ld2. In the example of FIG. 13, the second electrode Ed2 is one line portion, but may comprise a plurality of line portions. The second electrode Ed2 deviates from a center CL1 in a first direction X of the sub-pixels SP to the left in the figure. A gap is provided between the first electrode Ed1 and the second electrode Ed2, which are electrically independent of each other.

The common electrode CE comprises a first line portion Le1, a second line portion Le2, a third line portion Le3, a fourth line portion Le4, and a connection portion Ce connecting the lower end portions in the figure of the line portions Le1 to Le4. The first line portion Ld1 is disposed between the line portions Le1 and Le2. The second line portion Ld2 is disposed between the line portions Le2 and Le3. The second electrode Ed2 is disposed between the line portions Le3 and Le4.

The shapes of the line portions Ld1 and Ld2 and Le1 to Le4 and the second electrode Ed2 are bent in the same way as those of the line portions La1 and La2 of the first embodiment. The multi-domain sub-pixels SP thereby can be realized. The sub-pixels SP are not limited to a multi-domain structure.

An auxiliary capacitance line CS opposed to the pixel electrode PE with an insulating layer therebetween is disposed below the pixel electrode PE. A common voltage Vcom is supplied to the auxiliary capacitance line CS. A capacitance for maintaining a voltage applied to the pixel electrode PE is thereby formed between the pixel electrode PE and the auxiliary capacitance line CS.

In the example of FIG. 13, a second drain electrode DE2 of a second switching element SW2 is connected to the second electrode Ed2. In this structure, different voltages can be supplied to the first electrode Ed1 and the second electrode Ed2. More specifically, a first voltage V1 according to a gradation is supplied to the first electrode Ed1, and the first voltage V1 and a second voltage V2 are selectively supplied to the second electrode Ed2. The same method as that of the first embodiment can be applied to the control of a first switching element SW1 and the second switching element SW2.

FIG. 14 and FIG. 15 are schematic sectional views of a display panel PNL showing the relationship between an electric field EF formed between the pixel electrode PE and the common electrode CE and liquid crystal molecules LM included in a liquid crystal layer LQ. In FIG. 14, the first voltage V1 is supplied to the pixel electrode PE (the line portions Ld1 and Ld2 and the second electrode Ed2), and the common voltage Vcom is supplied to the common electrode CE (the line portions Le1 to Le4). The electric field EF thereby occurs in the vicinity of the line portions Ld1 and Ld2 and the second electrode Ed2, and the liquid crystal molecules LM are rotated as indicated by solid lines from an initial alignment direction indicated by broken lines. In this case, light TC, light TR, and light TL all have sufficient luminance, and image display in a first mode at a wide viewing angle can be realized.

In FIG. 15, the second voltage V2 is supplied to the second electrode Ed2. The second voltage V2 is, for example, equal to the first voltage V1. In this case, the electric field EF is not formed between the second electrode Ed2 and the third line portion Le3, and between the second electrode Ed2 and the fourth line portion Le4. Thus, the rotation of the liquid crystal molecules LM in the vicinity of the second electrode Ed2 is suppressed. Since most of the light TL passes through an area on the left of the center CL1 as described with reference to FIG. 5, the light TL is unlikely to be influenced by the rotated liquid crystal molecules LM. Thus, the light TL, which has been transmitted through a first polarizer PL1 and remains in a polarized state, reaches a second polarizer PL2, and most of the light TL is absorbed in the second polarizer PL2. Image display in a second mode in which the luminance of the light TL is lower than those of the light TC and the light TR thereby can be realized.

The second voltage V2 may be a voltage between the first voltage V1 and the common voltage Vcom. Also in this case, the rotation of the liquid crystal molecules LM in the vicinity of the second electrode Ed2 is suppressed as compared to that in a case where the first voltage V1 is supplied to the second electrode Ed2.

Also from the structure of the present embodiment, the same advantages as those of the first embodiment can be obtained. Furthermore, the luminance of the light TR can be lowered in the second mode by interchanging the positions of the first electrode Ed1 and the second electrode Ed2.

Fourth Embodiment

A fourth embodiment will be described. The description herein mainly focuses on points differing from the third embodiment, and an explanation of the same structure as in the third embodiment is omitted as appropriate.

FIG. 16 is a schematic plan view showing a structure which can be applied to sub-pixels SP in the present embodiment. In the present embodiment, the structure of a second switching element SW2 differs from that of the third embodiment.

In FIG. 16, the second switching element SW2 comprises two source electrodes SE2a and SE2b. The source electrode SE2a is connected to a signal line S. The source electrode SE2b is connected to an auxiliary capacitance line CS.

For example, a CMOS circuit which can selectively supply a first voltage V1, which has been supplied to the signal line S, and a common voltage Vcom (a second voltage V2), which has been supplied to the auxiliary capacitance line CS, to a second electrode Ed2 can be applied as the second switching element SW2. In this case, when a low voltage Vss is supplied to a second scanning line G2, the first voltage V1 of the signal line S is supplied to the second electrode Ed2, and when a high voltage Vdd is supplied to the second scanning line G2, the common voltage Vcom (the second voltage V2) of the auxiliary capacitance line CS is supplied to the second electrode Ed2.

Also from the above-described structure of the second switching element SW2, the same advantages as those of the third embodiment can be obtained. Moreover, since it is unnecessary to supply the first voltage V1 and the second voltage V2 to the signal line S in a time-division manner, driving at a high frequency can be realized.

Fifth Embodiment

A fifth embodiment will be described. The description herein mainly focuses on points differing from the third embodiment, and an explanation of the same structure as in the third embodiment is omitted as appropriate.

FIG. 17 is a schematic plan view showing a structure which can be applied to sub-pixels SP in the present embodiment. In the present embodiment, a pixel electrode PE and a common electrode CE are disposed in the same layer. The pixel electrode PE comprises a first line portion Lf1, a second line portion Lf2, a third line portion Lf3, and a connection portion Cf connecting the upper end portions in the figure of the line portions Lf1 to Lf3.

The common electrode CE comprises a first electrode Eg1 and a second electrode Eg2. The first electrode Eg1 comprises a first line portion Lg1, a second line portion Lg2, a third line portion Lg3, and a connection portion Cg connecting the lower end portions in the figure of the line portions Lg1 to Lg3. In the example of FIG. 17, the second electrode Eg2 is one line portion, but may comprise a plurality of line portions. The second electrode Eg2 deviates from a center CL1 in a first direction X of the sub-pixels SP to the left in the figure. A gap is provided between the first electrode Eg1 and the second electrode Eg2, which are electrically independent of each other.

The first line portion Lf1 is disposed between the line portions Lg1 and Lg2, the second line portion Lf2 is disposed between the second line portion Lg2 and the second electrode Eg2, and the third line portion Lf3 is disposed between the second electrode Eg2 and the third line portion Lg3.

The shapes of the line portions Lf1 to Lf3 and Lg1 to Lg3 and the second electrode Eg2 are bent in the same way as those of the line portions La1 and La2 of the first embodiment. The multi-domain sub-pixels SP thereby can be realized. The sub-pixels SP are not limited to a multi-domain structure.

In the example of FIG. 17, a second drain electrode DE2 of a second switching element SW2 is connected to the second electrode Eg2. In this structure, different voltages can be supplied to the first electrode Eg1 and the second electrode Eg2. More specifically, a common voltage Vcom is supplied to the first electrode Eg1, and the common voltage Vcom and a second voltage V2 are selectively supplied to the second electrode Eg2. The second voltage V2 is, for example, equal to a first voltage V1.

As in the case of the first embodiment, a method of supplying the first voltage V1(=V2) and the common voltage Vcom to a signal line S in a time-division manner can be applied to the control of a first switching element SW1 and the second switching element SW2.

Figure 18:
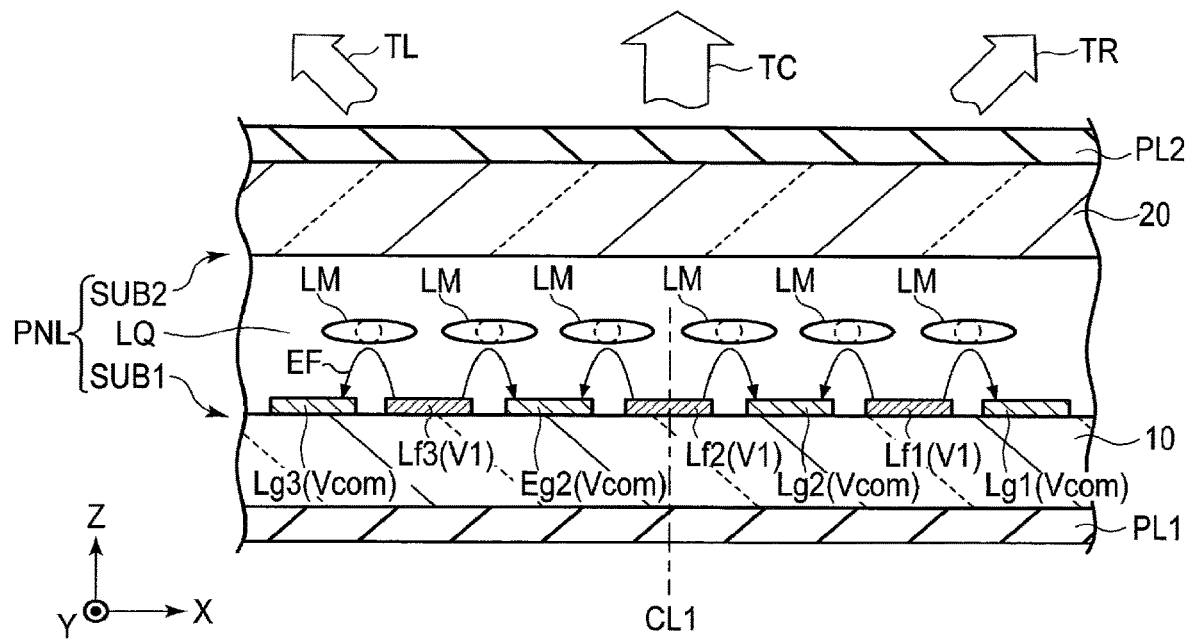
FIG. 18 is a schematic sectional view of a display panel in a first mode in the fifth embodiment.
Figure 19:
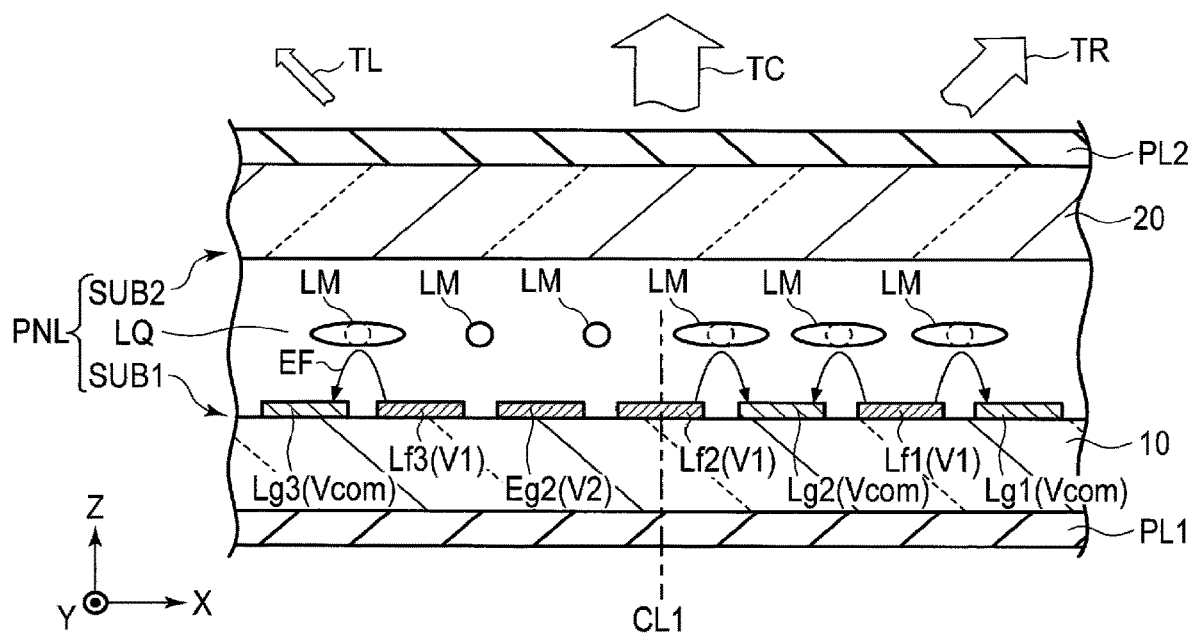
FIG. 19 is a schematic sectional view of the display panel in a second mode in the fifth embodiment.

FIG. 18 and FIG. 19 are schematic sectional views of a display panel PNL showing the relationship between an electric field EF formed between the pixel electrode PE and the common electrode CE and liquid crystal molecules LM included in a liquid crystal layer LQ. In FIG. 18, the first voltage V1 is supplied to the pixel electrode PE (the line portions Lf1 to Lf3), and the common voltage Vcom is supplied to the common electrode CE (the line portions Lg1 to Lg3 and the second electrode Eg2). The electric field EF thereby occurs in the vicinity of the line portions Lf1 to Lf3, and the liquid crystal molecules LM rotate as indicated by solid lines from an initial alignment direction indicated by broken lines. In this case, light TC, light TR, and light TL all have sufficient luminance, and image display in a first mode at a wide viewing angle can be realized.

In FIG. 19, the second voltage V2 is supplied to the second electrode Eg2. In this case, the electric field EF is not formed between the second electrode Eg2 and the second line portion Lf2, and between the second electrode Eg2 and the third line portion Lf3. Thus, the rotation of the liquid crystal molecules LM in the vicinity of the second electrode Eg2 is suppressed. Since most of the light TL passes through an area on the left of the center CL1 as described with reference to FIG. 5, the light TL is unlikely to be influenced by the rotated liquid crystal molecules LM. Thus, the light TL, which has been transmitted through a first polarizer PL1 and remains in a polarized state, reaches a second polarizer PL2, and most of the light TL is absorbed in the second polarizer PL2. Image display in a second mode in which the luminance of the light TL is lower than those of the light TC and the light TR thereby can be realized.

Also from the structure of the present embodiment, the same advantages as those of the first embodiment can be obtained. Furthermore, the luminance of the light TR can be lowered in the second mode by disposing the second electrode Eg2 on the first line portion Lf1 side with respect to the center CL1.

Sixth Embodiment

A sixth embodiment will be described. The description herein mainly focuses on points differing from the fifth embodiment, and an explanation of the same structure as in the fifth embodiment is omitted as appropriate.

Figure 20:
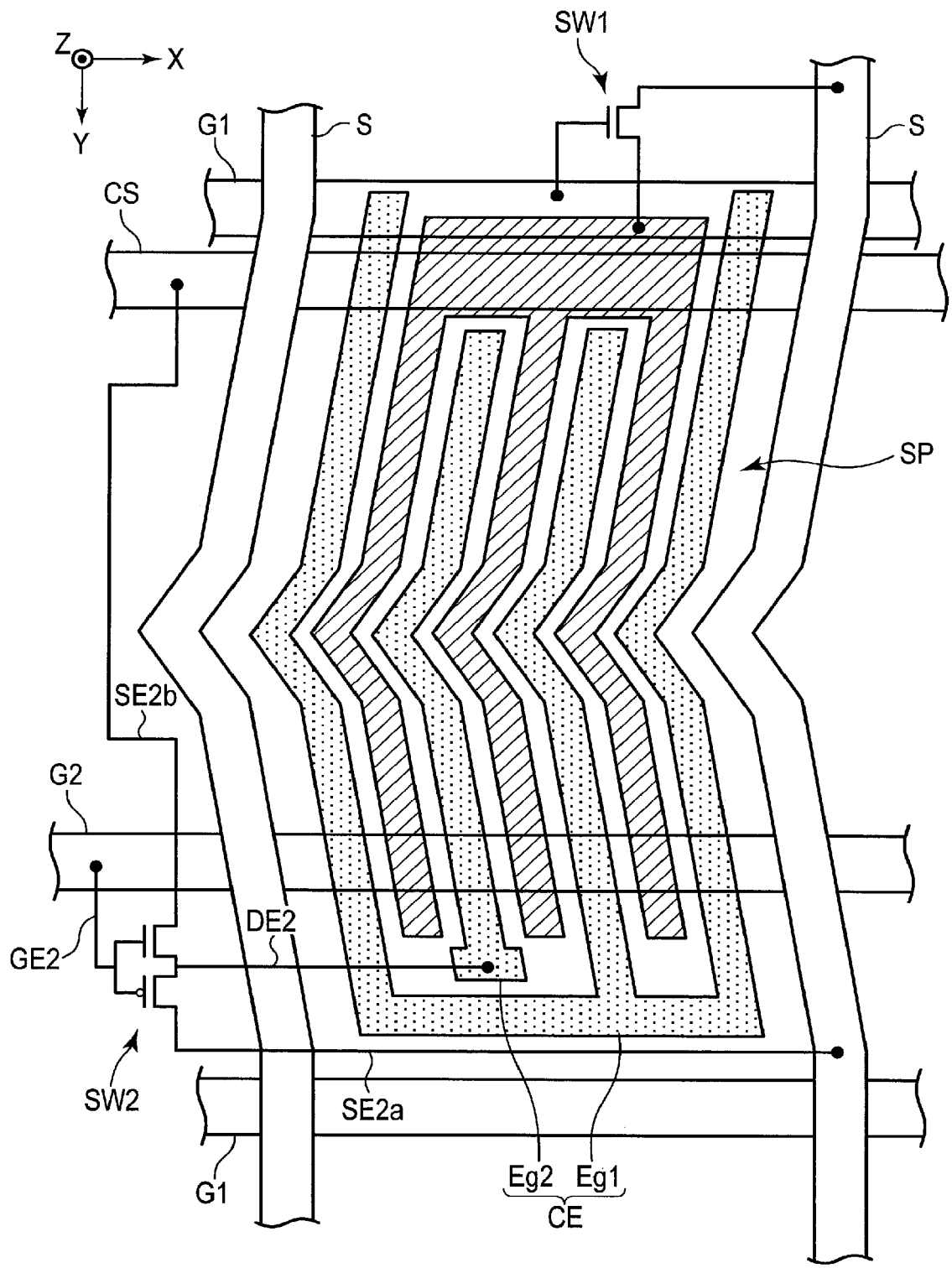
FIG. 20 is a schematic plan view showing a structure which can be applied to sub-pixels in a sixth embodiment.

FIG. 20 is a schematic plan view showing a structure which can be applied to sub-pixels SP in the present embodiment. In the present embodiment, the structure of a second switching element SW2 differs from that of the fifth embodiment. The second switching element SW2 has the same structure as that of the fourth embodiment (FIG. 16). A second drain electrode DE2 is connected to a second electrode Eg2.

Also from the structure of the present embodiment, the same advantages as those of the fifth embodiment can be obtained. Moreover, since it is unnecessary to supply a first voltage V1 and a second voltage V2 to a signal line S in a time-division manner, driving at a high frequency can be realized.

Seventh Embodiment

A seventh embodiment will be described. In the present embodiment, the structure for lowering luminance in both a range in which a polar angle is positive and a range in which the polar angle is negative in a second mode is disclosed. Regarding structures not particularly mentioned, the same structures as those of each of the above-described embodiments can be applied.

FIG. 21 is a schematic plan view showing a structure which can be applied to sub-pixels SP in the present embodiment. A pixel electrode PE is indicated by solid lines, and a common electrode CE is indicated by broken lines. The pixel electrode PE and the common electrode CE are opposed to each other with an insulating layer therebetween as in the case of the first embodiment.

The pixel electrode PE comprises a first electrode Eh1 and a second electrode Eh2. The first electrode Eh1 comprises a first line portion Lh1, a second line portion Lh2, and a connection portion Ch connecting the upper end portions in the figure of the line portions Lh1 and Lh2. The second electrode Eh2 is disposed between the line portions Lh1 and Lh2. The second electrode Eh2 overlaps a center CL1 in a first direction X of the sub-pixels SP. A gap is provided between the first electrode Eh1 and the second electrode Eh2, which are electrically independent of each other. The first electrode Eh1 may comprise three or more line portions. In addition, the second electrode Eh2 may comprise a plurality of line portions.

The shapes of the line portions Lh1 and Lh2 and the second electrode Eh2 are bent in the same way as those of the line portions La1 and La2 of the first embodiment. The multi-domain sub-pixels SP thereby can be realized. The sub-pixels SP are not limited to a multi-domain structure.

In the example of FIG. 21, a second drain electrode DE2 of a second switching element SW2 is connected to the second electrode Eh2. In this structure, different voltages can be supplied to the first electrode Eh1 and the second electrode Eh2. More specifically, a first voltage V1 according to a gradation is supplied to the first electrode Eh1, and the first voltage V1 and a second voltage V2 are selectively supplied to the second electrode Eh2. The same method as that of the first embodiment can be applied to the control of a first switching element SW1 and the second switching element SW2.

FIG. 22 and FIG. 23 are schematic sectional views of a display panel PNL showing the relationship between an electric field EF formed between the pixel electrode PE and the common electrode CE and liquid crystal molecules LM included in a liquid crystal layer LQ. In FIG. 22, the first voltage V1 is supplied to the pixel electrode PE (the line portions Lh1 and Lh2 and the second electrode Eh2), and a common voltage Vcom is supplied to the common electrode CE. The electric field EF thereby occurs in the vicinity of the line portions Lh1 and Lh2 and the second electrode Eh2, and the liquid crystal molecules LM are rotated as indicated by solid lines from an initial alignment direction indicated by broken lines. In this case, light TC, light TR, and light TL all have sufficient luminance, and image display in a first mode at a wide viewing angle can be realized.

In FIG. 23, the second voltage V2 is supplied to the second electrode Eh2. The second voltage V2 is, for example, equal to the common voltage Vcom. In this case, the electric field EF is not formed between the second electrode Eh2 and the common electrode CE. Thus, the rotation of the liquid crystal molecules LM in the vicinity of the second electrode Eh2 is suppressed. The light TC is influenced by the liquid crystal molecules LM rotated in the vicinity of the line portions Lh1 and Lh2. Thus, most of the light TC is transmitted through a second polarizer PL2 although the luminance of the light TC declines more than in the first mode.

Since most of the light TR and the light TL passes through an area in the vicinity of the center CL1 as described with reference to FIG. 5, the light TR and the light TL are unlikely to be influenced by the rotated liquid crystal molecules LM in the state of FIG. 23. Thus, the light TR and the light TL, which have been transmitted through a first polarizer PL1 and remain in a polarized state, reach the second polarizer PL2, and most of the light TR and the light TL is absorbed in the second polarizer PL2. Image display in a second mode in which the luminance of the light TR and the luminance of the light TL are lower than that of the light TC thereby can be realized.

The second voltage V2 may be a voltage between the first voltage V1 and the common voltage Vcom. Also in this case, the rotation of the liquid crystal molecules LM in the vicinity of the second electrode Eh2 is suppressed as compared to that in a case where the first voltage V1 is supplied to the second electrode Eh2.

The second mode in the present embodiment is effective in preventing, for example, a displayed image from being peeped at, not from the front, but from other directions. As application examples of the above-described display device 1, for example, a smartphone, a tablet terminal, and a notebook personal computer are assumed.

In the present embodiment, an example in which the pixel electrode PE comprises the first electrode and the second electrode when the pixel electrode PE and the common electrode CE are disposed in different layers has been illustrated. However, the common electrode CE may comprise a first electrode and a second electrode as in the case of the second embodiment. Moreover, the pixel electrode PE and the common electrode CE may be disposed in the same layer as in the case of the third to sixth embodiments. In any case, the same advantages as those of the present embodiment can be obtained by disposing the second electrode in the vicinity of the center CL1.

All of the display devices that can be embodied by making design changes to the display devices described as the embodiments of the present invention as appropriate by a person having ordinary skill in the art also fall within the scope of the present invention as long as they are in keeping with the spirit of the present invention.

Various modified examples are conceivable within the category of the ideas of the present invention by a person having ordinary skill in the art, and the modified examples are also considered to fall within the scope of the present invention. For example, additions, deletions or design changes of structural elements, or additions, omissions or changes in condition of steps which are made as appropriate by a person having ordinary skill in the art, in each of the above-described embodiments, also fall within the scope of the present invention as long as they are in keeping with the spirit of the present invention.

In addition, other advantageous effects brought about by the aspects described in each of the embodiments, which are obvious from the descriptions of the present specification or which can be conceived as appropriate by a person having ordinary skill in the art, are considered to be achievable by the present invention as a matter of course.

What is claimed is:

1. A liquid crystal display device comprising:
a first substrate including a sub-pixel;
a second substrate opposed to the first substrate; and
a liquid crystal layer between the first substrate and the second substrate,
wherein the first substrate comprises:
a common electrode to which a common voltage is supplied;
a pixel electrode including a first electrode and a second electrode arranged in a first direction in the sub-pixel;
a first switching element connected to the first electrode;
a second switching element connected to the second electrode;
a signal line to which a first voltage is supplied; and
a capacitance line which is opposed to the pixel electrode and to which a second voltage is supplied,
wherein the first switching element supplies the first voltage from the signal line to the first electrode,
when the liquid crystal display device is in a first mode the second switching element supplies the first voltage from the signal line to the second electrode and when the liquid crystal display device is in a second mode the second switching element supplies the second voltage from the capacitance line to the second electrode, and
the second voltage is a voltage equal to the common voltage or between the first voltage and the common voltage.

2. The liquid crystal display device of claim 1, wherein when the first voltage is supplied to the second electrode, luminance of the sub-pixel in a direction inclined at an angle +θ toward the first direction with respect to a normal direction of the first substrate, and luminance of the sub-pixel in a direction inclined at an angle −θ toward the first direction with respect to the normal direction are equal to each other, and
when the second voltage is supplied to the second electrode, the luminance of the sub-pixel in the direction inclined at the angle +θ and the luminance of the sub-pixel in the direction inclined at the angle −θ are different from each other.

3. The liquid crystal display device of claim 1, wherein the first electrode includes a plurality of first line portions arranged in the first direction with the second electrode,
the common electrode includes a plurality of second line portions arranged in the first direction, and
the first line portions and the second electrode are each located between adjacent two of the second line portions.

4. The liquid crystal display device of claim 1, further comprising:
a first scanning line which supplies a first scanning signal to the first switching element; and
a second scanning line which supplies a second scanning signal to the second switching element.

5. The liquid crystal display device of claim 4, wherein the first electrode includes a plurality of line portions arranged in the first direction and a connection portion connecting end portions of the line portions,
the first scanning line is opposed to the connection portion, and
the second scanning line is opposed to the line portions.

6. The liquid crystal display device of claim 1, wherein the second electrode is disposed at a position different from a center of the sub-pixel in the first direction.

7. The liquid crystal display device of claim 6, wherein the first electrode overlaps the center or the sub-pixel.

8. A liquid crystal display device comprising:
a first substrate including a sub-pixel;
a second substrate opposed to the first substrate; and
a liquid crystal layer between the first substrate and the second substrate,
wherein the first substrate comprises:
a pixel electrode which is disposed in the sub-pixel and to which a first voltage is supplied,
a common electrode including a first electrode and a second electrode arranged in a first direction in the sub-pixel;
a first switching element connected to the pixel electrode; and
a second switching element connected to the second electrode,
wherein the first electrode comprises an aperture in the sub-pixel, and
the second electrode is disposed in the aperture.

9. The liquid crystal display device of claim 8, wherein the second electrode is disposed at a position different from a center of the sub-pixel in the first direction.

10. The liquid crystal display device of claim 8, wherein the pixel electrode includes a plurality of first line portions arranged in the first direction,
the first electrode includes a plurality of second line portions arranged in the first direction with the second electrode, and
the first line portions are each located between adjacent two of the second line portions or between a second line portion adjacent to the second electrode of the second line portions and the second electrode.

11. The liquid crystal display device of claim 8, further comprising:
a first scanning line which supplies a first scanning signal to the first switching element; and
a second scanning line which supplies a second scanning signal to the second switching element.

12. The liquid crystal display device of claim 11, wherein the first scanning line does not overlap the second electrode, and the second scanning line overlaps the second electrode.

13. The liquid crystal display device of claim 8, wherein a common voltage is supplied to the first electrode, when the liquid crystal display device is in a first mode the common voltage is supplied to the second electrode and when the liquid crystal display device is in a second mode a second voltage is supplied to the second electrode, and the second voltage is a voltage equal to the first voltage, or between the first voltage and the common voltage.

14. The liquid crystal display device of claim 13, further comprising a signal line to which the common voltage and the second voltage are supplied in a time-division manner, wherein when the liquid crystal display device is in the first mode the second switching element supplies the common voltage from the signal line to the second electrode and when the liquid crystal display device is in the second mode the second switching element supplies the second voltage from the signal line to the second electrode.

15. The liquid crystal display device of claim 13, wherein the first substrate further comprises a signal line to which the second voltage is supplied and a capacitance line which is opposed to the pixel electrode and to which the common voltage is supplied, when the liquid crystal display device is in the first mode the second switching element supplies the second voltage from the signal line to the second electrode and when the liquid crystal display device is in the second mode the second switching element supplies the common voltage from the capacitance line to the second electrode.

16. The liquid crystal display device of claim 13, wherein when the common voltage is supplied to the second electrode, luminance of the sub-pixel in a direction inclined at an angle $+\theta$ toward the first direction with respect to a normal direction of the first substrate, and luminance of the sub-pixel in a direction inclined at an angle $-\theta$ toward the first direction with respect to the normal direction are equal to each other, and when the second voltage is supplied to the second electrode, the luminance of the sub-pixel in the direction inclined at the angle $+\theta$ and the luminance of the sub-pixel in the direction inclined at the angle $-\theta$ are different from each other.

* * * * *